US012795664B2

(12) United States Patent
Xue et al.

(10) Patent No.: US 12,795,664 B2
(45) Date of Patent: Nov. 10, 2026

(54) MULTIPLE COMMUNICATION OPPORTUNITIES FOR SEMI-PERSISTENT SCHEDULING OCCASION

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US); Ozcan Ozturk, San Diego, CA (US); Mostafa Khoshnevisan, San Diego, CA (US); Tao Luo, San Diego, CA (US); Juan Montojo, San Diego, CA (US); Peter Gaal, San Diego, CA (US); Piyush Gupta, Bridgewater, NJ (US); Changlong Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 559 days.

(21) Appl. No.: 17/921,932

(22) PCT Filed: May 6, 2020

(86) PCT No.: PCT/CN2020/088659

§ 371 (c)(1),
(2) Date: Oct. 27, 2022

(87) PCT Pub. No.: WO2021/223078

PCT Pub. Date: Nov. 11, 2021

(65) Prior Publication Data

US 2023/0180232 A1 Jun. 8, 2023

(51) Int. Cl.

*H04W 72/1273* (2023.01)
*H04L 1/1812* (2023.01)

(52) U.S. Cl.

CPC ........ *H04W 72/1273* (2013.01); *H04L 1/1812* (2013.01)

(58) Field of Classification Search

CPC ......... H04W 72/1273; H04W 72/0446; H04W 72/04; H04L 1/1812; H04L 1/1893; H04L 1/1822

See application file for complete search history.

(56) References Cited

U.S. PATENT DOCUMENTS 8,595,579 B2 11/2013 Yang et al.
11,646,832 B2 5/2023 Rastegardoost et al.
(Continued)

FOREIGN PATENT DOCUMENTS

CN 103875201 A 6/2014
CN 109152075 A 1/2019
(Continued)

OTHER PUBLICATIONS

Supplementary European Search Report—EP20934626—Search Authority—The Hague—Jan. 29, 2024.
(Continued)

*Primary Examiner* — Justin T Van Roie
(74) *Attorney, Agent, or Firm* — Loza & Loza, LLP

(57) ABSTRACT

Information is communicated via a plurality of communication opportunities of a semi-persistent scheduling (SPS) occasion. A base station may transmit first information via a first communication opportunity of an SPS occasion and transmit second information via a second communication opportunity of that same SPS occasion. A wireless communication device may monitor all communication opportunities of an SPS occasion to decode the information sent in two or more of the communication opportunities of the SPS occasion.

30 Claims, 16 Drawing Sheets

(56) References Cited

U.S. PATENT DOCUMENTS

| | | | | |
|---|---|---|---|---|
| 12,302,336 | B2 * | 5/2025 | Awoniyi-Oteri | H04L 1/1854 |
| 12,348,316 | B2 * | 7/2025 | Xue | H04W 72/20 |
| 2015/0139155 | A1 | 5/2015 | Wang et al. | |
| 2019/0132092 | A1 | 5/2019 | Chen et al. | |
| 2019/0166621 | A1 | 5/2019 | Yerramalli et al. | |
| 2019/0191416 | A1 | 6/2019 | Xie et al. | |
| 2019/0268971 | A1 | 8/2019 | Talarico et al. | |
| 2019/0281606 | A1 | 9/2019 | Liu et al. | |
| 2019/0289624 | A1 | 9/2019 | Dudda et al. | |
| 2019/0356455 | A1 | 11/2019 | Yang et al. | |
| 2021/0153204 | A1 * | 5/2021 | Takeda | H04L 5/0023 |
| 2022/0191900 | A1 | 6/2022 | Takeda et al. | |
| 2022/0416955 | A1 | 12/2022 | Xue | |
| 2023/0069103 | A1 * | 3/2023 | Awoniyi-Oteri | H04L 1/1887 |
| 2023/0112147 | A1 | 4/2023 | Chien | |
| 2023/0135551 | A1 | 5/2023 | Gao | |
| 2023/0164764 | A1 | 5/2023 | Chen et al. | |
| 2023/0239077 | A1 | 7/2023 | Gerami et al. | |

FOREIGN PATENT DOCUMENTS

| | | | |
|---|---|---|---|
| CN | 109565676 | A | 4/2019 |
| CN | 110115081 | A | 8/2019 |
| EP | 3780717 | A1 | 2/2021 |
| WO | 2019103809 | | 5/2019 |
| WO | 2019112186 | A1 | 6/2019 |
| WO | 2019193700 | A1 | 10/2019 |
| WO | 2019243249 | A1 | 12/2019 |
| WO | 2020060805 | A1 | 3/2020 |
| WO | 2020188815 | A1 | 9/2020 |
| WO | 2022006580 | | 1/2022 |

OTHER PUBLICATIONS

VIVO: "Other issues for URLLC and UE features", R1-1912037, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, XP051823169, 10 Pages.

Institute for Information Industry (III): "On DL SPS Enhancements for IIoT", 3GPP TSG RAN WG1 #98bis, R1-1911019, Chongqing, China, Oct. 14-20, 2019, Oct. 4, 2019, the whole document, pp. 1-3.

International Search Report and Written Opinion—PCT/CN2020/088659—ISA/EPO—Jan. 28, 2021.

Ericsson: "On Configuration Aspects for Multiple SPS and CG", 3GPP TSG-RAN WG2 #106 Tdoc, R2-1906838, May 17, 2019 (May 17, 2019), 4 Pages, section 2.1.

Ericsson: "On Configuration Aspects for Multiple SPS and CG", 3GPP TSG-RAN WG2 #106, Tdoc R2-1906838, Reno, US, May 13, 2019-May 17, 2019, May 17, 2019, Agenda Item: 11.7.2.2, 4 Pages.

OPPO: "Remaining Issues on NR-U Configured Grant", 3GPP TSG-RAN WG2 Meeting #108, R2-1914403, Nov. 22, 2019 (Nov. 22, 2019), 7 Pages, section 2.1.

OPPO: "Remaining Issues on NR-U Configured Grant", 3GPP TSG-RAN WG2 Meeting #108, R2-1914403, Reno, USA, Nov. 18, 2019-Nov. 22, 2019, Nov. 22, 2019, Agenda Item: 6.2.2.5, pp. 1-7.

* cited by examiner

MULTIPLE COMMUNICATION OPPORTUNITIES FOR SEMI-PERSISTENT SCHEDULING OCCASION

CROSS-REFERENCE TO RELATED APPLICATION(S)

This application is the U.S. national stage of PCT patent application number PCT/CN2020/088659 filed on May 6, 2020.

TECHNICAL FIELD

Aspects of the present disclosure generally relate to wireless communication, and more specifically, to communicating information via a plurality of communication opportunities of a semi-persistent scheduling opportunity.

BACKGROUND

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

A BS may schedule access to a cell to support access by multiple UEs. For example, a BS may allocate different resources (e.g., time domain and frequency domain resources) for different UEs operating within a cell of the BS.

As the demand for mobile broadband access continues to increase, research and development continue to advance communication technologies, including technologies for enhancing communication within a wireless network in particular, not only to meet the growing demand for mobile broadband access, but to advance and enhance the user experience with mobile communications.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to communicating information via a plurality of communication opportunities of a semi-persistent scheduling (SPS) occasion. For example, a base station may transmit first information via a first communication opportunity of an SPS occasion and transmit second information via a second communication opportunity of that same SPS occasion. In addition, a wireless communication device may monitor all communication opportunities of an SPS occasion to decode the information sent in two or more of the communication opportunities of the SPS occasion.

In some examples, a method of wireless communication at a wireless communication device may include receiving a message from a base station. The message may indicate a periodicity between semi-persistent scheduling (SPS) occasions for a configured SPS. The method may also include receiving, from the base station, a transmission for a first SPS occasion of the SPS occasions. The first SPS occasion may include a plurality of communication opportunities. The method may further include decoding downlink information included in at least two of the plurality of communication opportunities.

In some examples, a wireless communication device may include a transceiver, a memory, and a processor communicatively coupled to the transceiver and the memory. The processor and the memory may be configured to receive a message from a base station via the transceiver. The message may indicate a periodicity between semi-persistent scheduling (SPS) occasions for a configured SPS. The processor and the memory may also be configured to receive, from the base station via the transceiver, a transmission for a first SPS occasion of the SPS occasions. The first SPS occasion may include a plurality of communication opportunities. The processor and the memory may be further configured to decode downlink information included in at least two of the plurality of communication opportunities.

In some examples, a wireless communication device may include means for receiving a message from a base station. The message may indicate a periodicity between semi-persistent scheduling (SPS) occasions for a configured SPS. The means for receiving may be configured for receiving a transmission for a first SPS occasion of the SPS occasions. The first SPS occasion may include a plurality of communication opportunities. The wireless communication device may also include means for decoding downlink information included in at least two of the plurality of communication opportunities.

In some examples, an article of manufacture for use by a wireless communication device includes a computer-readable medium having stored therein instructions executable by one or more processors of the wireless communication device to receive a message from a base station. The message may indicate a periodicity between semi-persistent scheduling (SPS) occasions for a configured SPS. The computer-readable medium may also have stored therein instructions executable by one or more processors of the wireless communication device to receive, from the base station, a transmission for a first SPS occasion of the SPS occasions. The first SPS occasion may include a plurality of communication opportunities. The computer-readable medium may have stored therein further instructions executable by one or more processors of the wireless communication device to decode downlink information included in at least two of the plurality of communication opportunities.

In some examples, a method of wireless communication at a base station may include generating a message indicating a periodicity between semi-persistent scheduling (SPS) occasions for a configured SPS, transmitting the message to a wireless communication device, and transmitting, to the wireless communication device, a transmission for a first SPS occasion of the SPS occasions. The first SPS occasion may include a plurality of communication opportunities. At least two of the plurality of communication opportunities may include downlink information.

In some examples, a base station may include a transceiver, a memory, and a processor communicatively coupled to the transceiver and the memory. The processor and the memory may be configured to generate a message indicating a periodicity between semi-persistent scheduling (SPS) occasions for a configured SPS, transmit the message to a wireless communication device via the transceiver, and transmit, to the wireless communication device via the transceiver, a transmission for a first SPS occasion of the SPS occasions. The first SPS occasion may include a plurality of communication opportunities. At least two of the plurality of communication opportunities may include downlink information.

In some examples, a base station may include means for generating a message indicating a periodicity between semi-persistent scheduling (SPS) occasions for a configured SPS and means for transmitting the message to a wireless communication device. The means for transmitting may be configured for transmitting a transmission for a first SPS occasion of the SPS occasions. The first SPS occasion may include a plurality of communication opportunities. At least two of the plurality of communication opportunities may include downlink information.

In some examples, an article of manufacture for use by a base station includes a computer-readable medium having stored therein instructions executable by one or more processors of the base station to generate a message indicating a periodicity between semi-persistent scheduling (SPS) occasions for a configured SPS, transmit the message to a wireless communication device, and transmit, to the wireless communication device, a transmission for a first SPS occasion of the SPS occasions. The first SPS occasion may include a plurality of communication opportunities. At least two of the plurality of communication opportunities may include downlink information.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. The description that follows provides illustrative examples, without limitation, of various aspects of the present disclosure.

Figure 1:
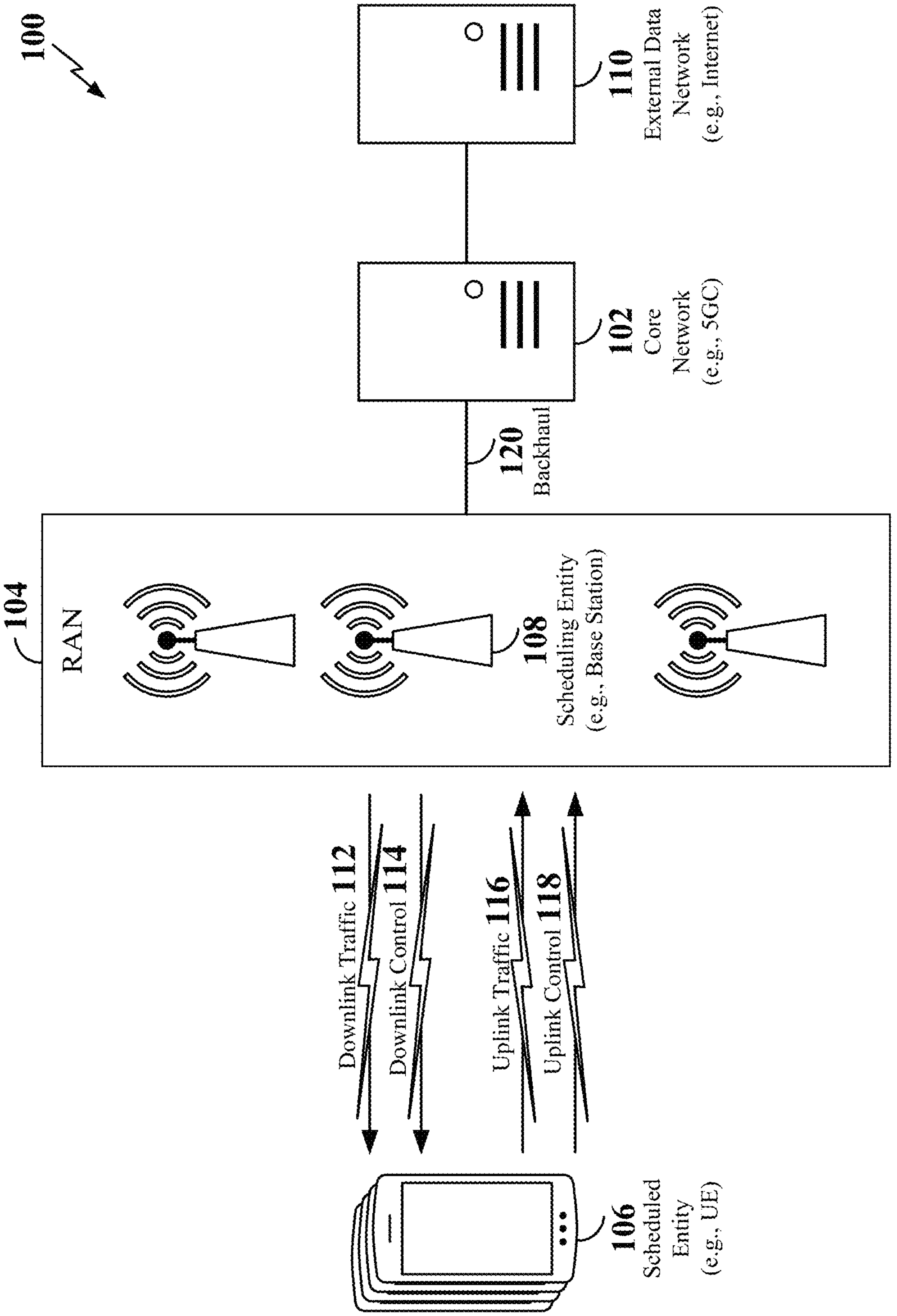
FIG. 1 is a schematic illustration of a wireless communication system according to some aspects of the disclosure.

FIG. 1 is a schematic illustration of a wireless communication system 100 according to some aspects of the disclosure. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
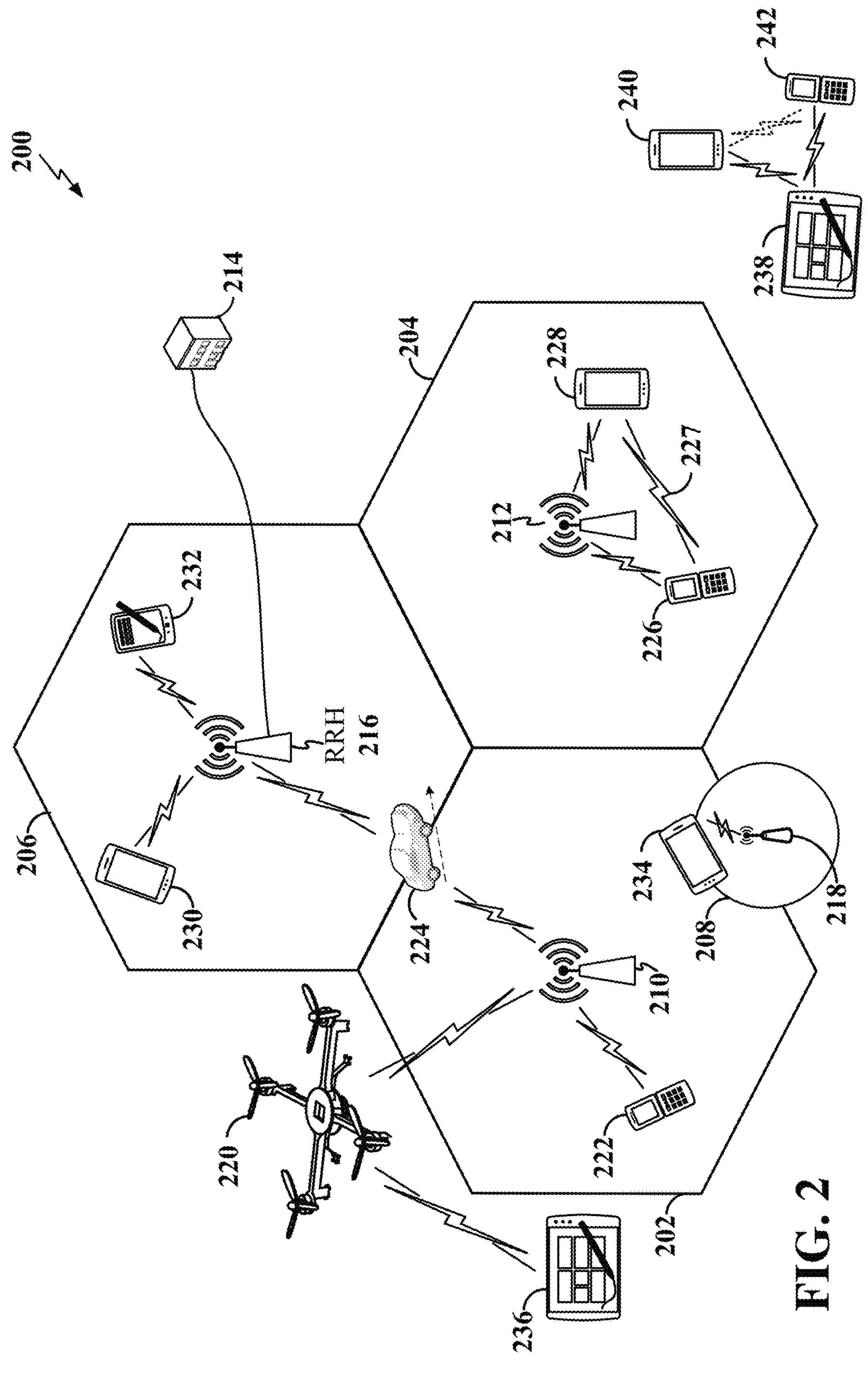
FIG. 2 is a conceptual illustration of an example of a radio access network (RAN) according to some aspects of the disclosure.

FIG. 2 is a conceptual illustration of an example of a radio access network (RAN) 200 according to some aspects of the disclosure. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancelation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
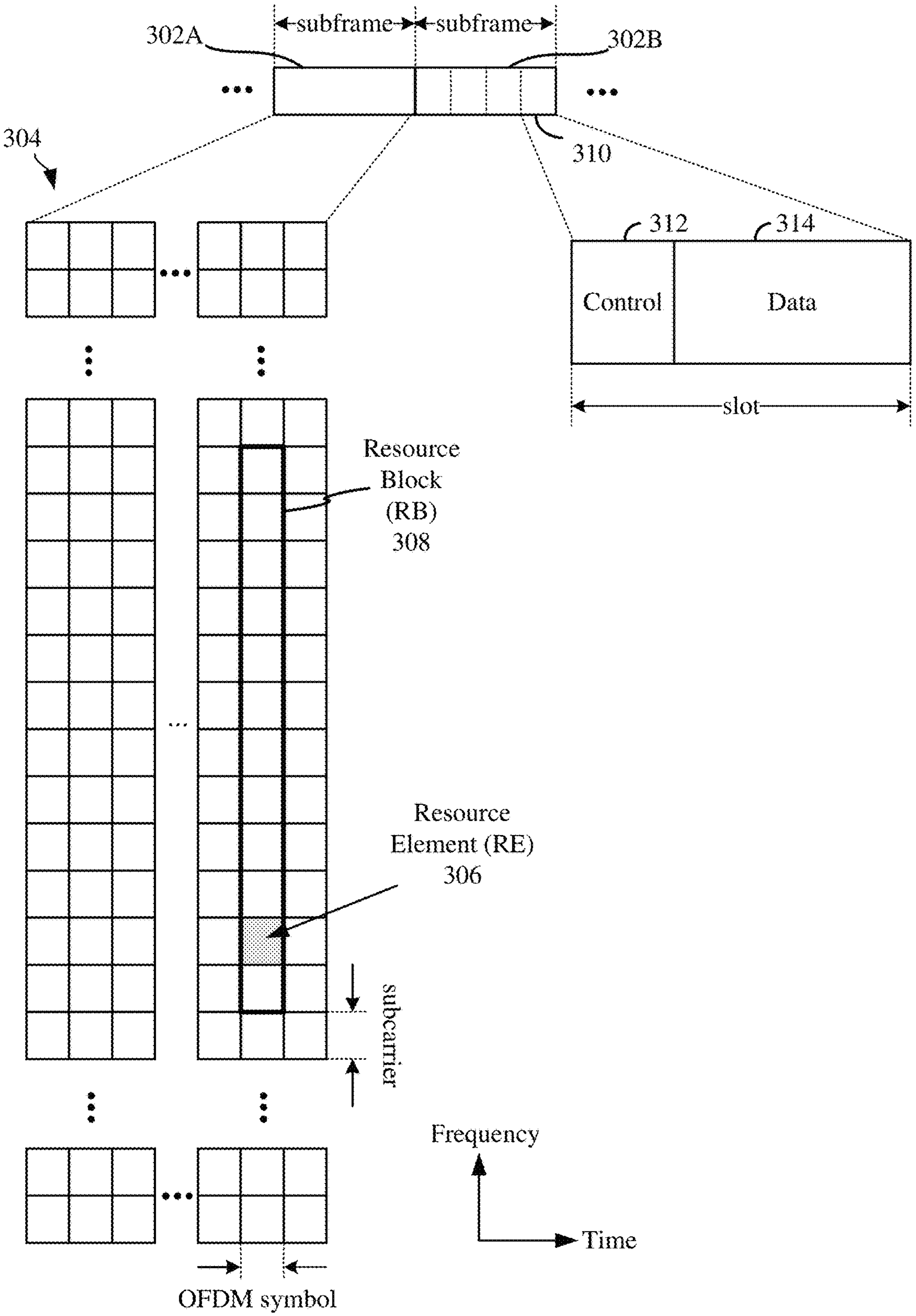
FIG. 3 is a schematic illustration of wireless resources in an air interface utilizing orthogonal frequency divisional multiplexing (OFDM) according to some aspects of the disclosure.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

FIG. 3 is a schematic illustration of wireless resources in an air interface utilizing orthogonal frequency divisional multiplexing (OFDM) according to some aspects of the disclosure. In FIG. 3, an expanded view of an example DL subframe (SF) 302A is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more bandwidth parts (BWPs), where each BWP includes two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information—reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In some networks, a base station may use dynamic scheduling or semi-persistent scheduling (SPS) to schedule a UE. Dynamic scheduling may involve using a DCI to schedule an individual transmission or reception (e.g., on PDSCH or PUSCH). For example, a base station may use a first DCI to schedule a first PDSCH transmission, use a second DCI to schedule a second PDSCH transmission, and so on.

In contrast, for SPS, a base station may use a single DCI to schedule multiple transmissions (e.g., on PDSCH). In some implementations, a base station transmits an RRC message to configure an SPS (e.g., for a particular cell and a particular BWP). The base station may then send a DCI to activate the SPS.

The SPS configuration indicates an SPS periodicity between SPS occasions. In this way, the SPS configuration may schedule multiple SPS occasions at the indicated periodicity. In some examples, the periodicity may be referenced to a system frame number (SFN) and a sub-frame number of the DCI that initializes the SPS.

Thus, a UE can monitor the PDSCH at the SPS occasions according to the scheduled SPS periodicity to periodically obtain data from the base station. At some point in time, the base station may send a DCI to deactivate the SPS. In addition, the base station may send a DCI to reactivate the SPS.

The disclosure relates in some aspects to transmitting information in multiple communication opportunities of an SPS occasion. Here, an SPS occasion is defined to include multiple communication opportunities. For example, a given SPS occasion may be assigned several time slots (hereafter referred to simply as slots), where each communication occasion is associated with a corresponding one of the slots (or a corresponding subset of the slots). A base station may therefore transmit first information via a first communication opportunity of an SPS occasion and transmit second information via a second communication opportunity of that same SPS occasion. A wireless communication device (e.g., a UE) may blindly decode over all of the communication opportunities to recover information transmitted in any of the communication opportunities.

Figure 4:
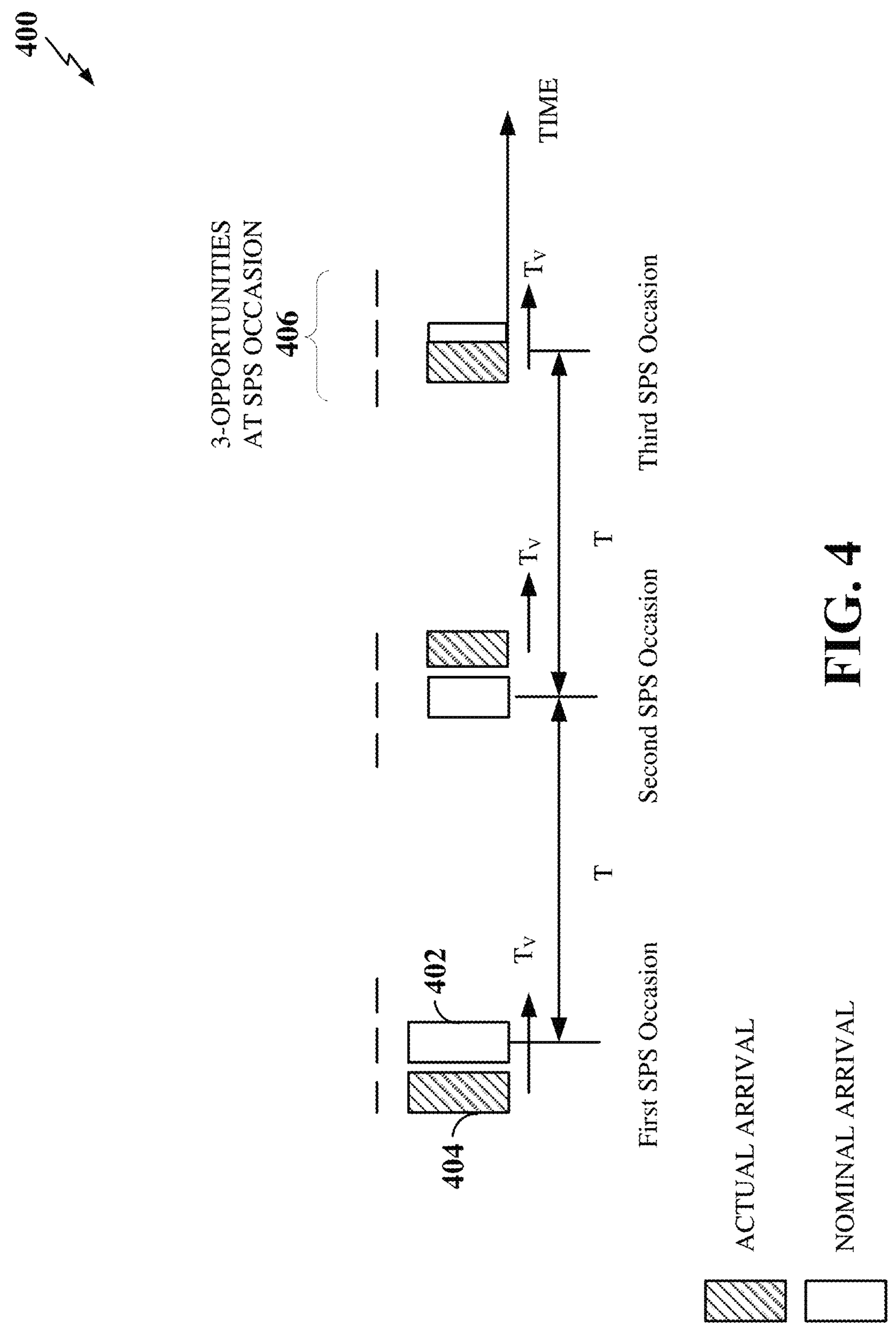
FIG. 4 is a conceptual illustration of an example of multiple communication opportunities of a semi-persistent scheduling (SPS) occasion according to some aspects of the disclosure.

FIG. 4 is a conceptual illustration of an example of multiple communication opportunities of an SPS occasion 400 according to some aspects of the disclosure. Three SPS occasions are shown separated in time by a period of time T that is based on the configured SPS periodicity. DL traffic is scheduled by the SPS to arrive at a nominal arrival time (e.g., nominal arrival time 402).

In practice, received data may be subject to jitter. FIG. 4 illustrates DL traffic with non-trivial jitter around a nominal arrival time and a low latency delivery requirement (within a window for delivery $T_V$). For example, a DL transmission may be received prior to the nominal arrival time (e.g., as illustrated by an actual arrival 404), after the nominal arrival time, or partially overlapping with the nominal arrival time as illustrated. In a multiple-opportunity SPS, multiple communication opportunities are provided per SPS occasion for a UE to receive the DL traffic in a situation where the base station transmits according to a packet arrival over one communication opportunity (e.g., corresponding to the nominal arrival time).

As illustrated in FIG. 4, each SPS occasion is defined with (e.g., includes) three communication opportunities (e.g., as represented by the three lines 406 for the third SPS occasion) in this example. A different number of communication opportunities could be used in other examples. A UE may decode over all three of the communication opportunities in FIG. 4 to receive the DL traffic. Thus, a UE will be able to successfully receive traffic within any of the three communication opportunities. Accordingly, a multiple-opportunity SPS may be used to accommodate jittered periodic DL traffic (e.g., as shown in FIG. 4).

A multiple-opportunity SPS may offer benefits over the use of multiple SPS configurations (e.g., where a base station establishes multiple SPS allocations, each of which is scheduled on different resources). For example, a multiple-opportunity SPS may use a smaller number of HARQ processes, use a smaller number of HARQ responses, and have lower overhead on RRC configurations and DCI activation/deactivation as compared to a scenario that uses multiple SPS configurations.

In some examples, the communication opportunities within an SPS occasion may be homogeneous in terms of radio resource allocation. For example, different communication opportunities within the same SPS occasion may have the same frequency domain resource allocation (FDRA), the same start and length indicator vector (SLIV), and the same MCS. This approach may be advantageous when transmitting a fixed-size packet with jittered arrival. For example, a smaller DCI (smaller number of bits) can be used for activation/re-activation since unique information is not needed for each communication opportunity.

The use of homogeneous radio resource allocations for different communication opportunities within an SPS occasion may provide other benefits as well. For example, listen-before-talk (LBT) uncertainties at a base station can be mitigated by allocating communication opportunities to different LBT bandwidth (BW) in the 5 GHz/6 GHz unlicensed band. In addition, more flexible scheduling can be supported (e.g., Frequency Range 2 (FR2) may be used) by allocating communication opportunities with different receive (RX) beams. Also, slot aggregation can be turned on over some communication opportunities for delivering ultra-reliably packets.

In some scenarios, a UE may need to carry more than one periodic flow. For example, an industrial IoT (IIoT) UE can be connected to more than one sensor and/or actuator. In addition, the associated concurrent traffic flows can have different periodicities and/or have different latency requirements.

The disclosure relates in some aspects to sending information over multiple communication opportunities of an SPS occasion. For example, a base station may transmit data on a first communication opportunity and a second communication opportunity of the same SPS occasion.

The disclosure also relates in some aspects, to sending information over multiple communication sub-opportunities for each SPS communication opportunity. This may be referred to as massive-opportunity SPS DL.

Figure 5:
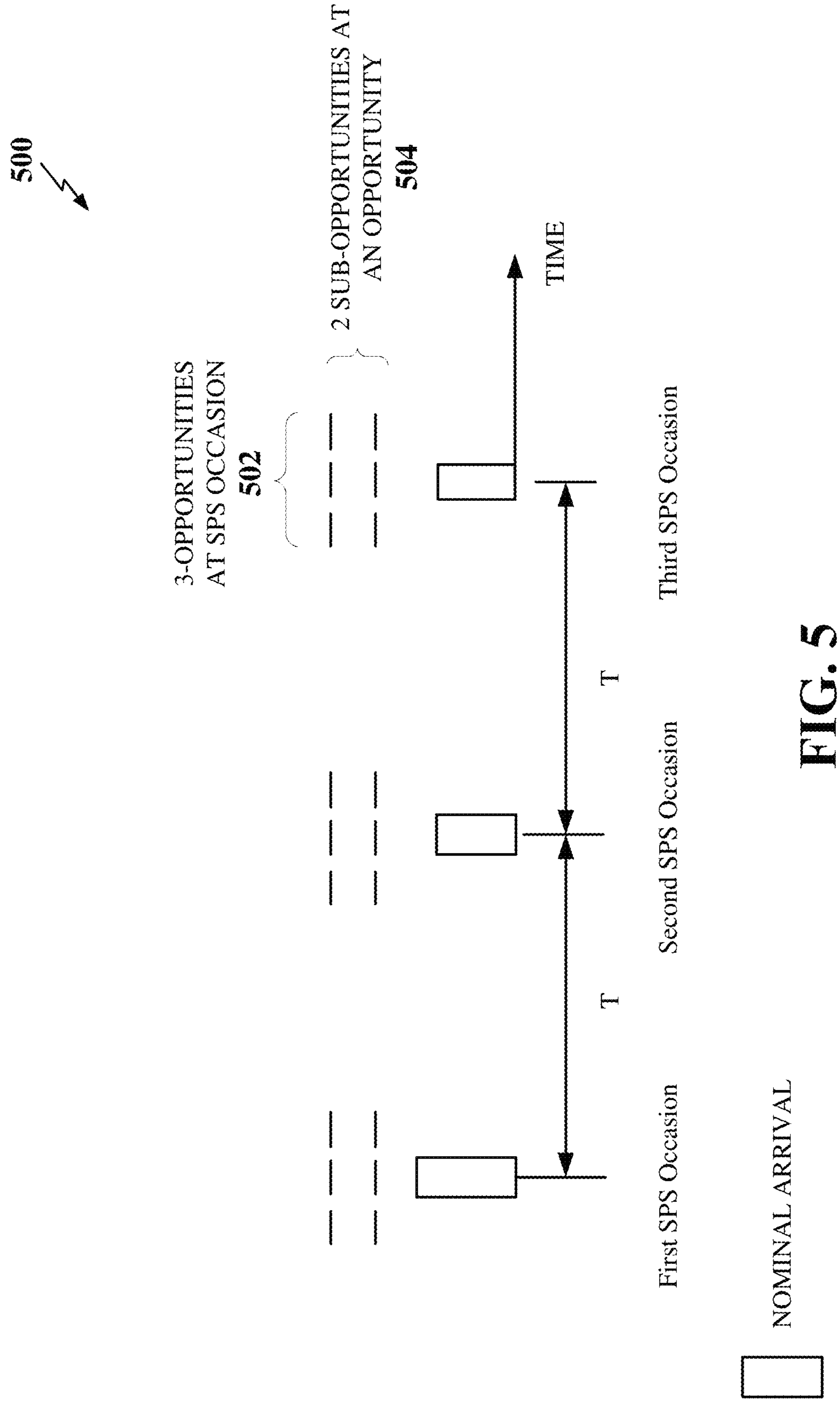
FIG. 5 is a conceptual illustration of an example of multiple communication opportunities and communication sub-opportunities of an SPS occasion according to some aspects of the disclosure.

FIG. 5 is a conceptual illustration of an example of multiple communication opportunities and communication sub-opportunities of SPS occasions 500 according to some aspects of the disclosure. Similar to FIG. 4, each SPS occasion is defined with (e.g., includes) three communication opportunities (e.g., as represented by the three columns 502 for the third SPS occasion) in this example. In addition, each communication opportunity is defined with (e.g., includes) two communication sub-opportunities (e.g., as represented by the two rows 504 for the third SPS occasion)

A base station may transmit over any one or more of the communication opportunities. A UE may be configured via RRC to support a multiple-opportunity SPS DL. A parameter s (s≥1) may specify the number of communication opportunities starting from the offset in a given period.

In some examples, one HARQ process may be used per communication opportunity. A UE may perform blind decoding of the SPS PDSCH at each communication opportunity, and report s-bit ACK/NACK (A/N) feedback. Based on the A/N feedback, the base station can schedule a retransmission on a per-opportunity basis using dynamic grants (DGs).

In some examples, a base station may transmit one transport block (TB) per communication opportunity for an "opportunistic" massive opportunity. In some examples, a base station may transmit multiple TBs per communication opportunity for a massive opportunity. In some examples, a base station may transmit multiple transport blocks (TBs) over more than one communication opportunity in a SPS occasion.

As discussed herein, the use of communication opportunities may provide lower signaling overhead than other techniques. However, the use of communication opportunities may result in additional overhead associated with the per-opportunity HARQ process and per-opportunity A/N feedback. Nevertheless, the use of communication opportunities may still have lower RRC configuration (L3) overhead and lower DCI activation/re-activation (L1) overhead in comparison with multiple SPS configurations that require separate RRC messaging and DCIs for multiple SPS processes.

In some examples, the communication opportunities (e.g., for a given SPS or for a given SPS occasion) may be homogeneous. For example, the communication opportunities may share a common TDRA, a common FDRA (for FDM, including different component carriers), antenna ports and/or transmission configuration indicators (TCIs) (for spatial division multiplexing, SDM), or a combination thereof.

In some examples, the communication opportunities may be heterogeneous. The use of heterogeneous communication opportunities may involve the use of more bits in the activation/re-activation DCI than in the homogeneous scenario. Nevertheless, the L3 and L1 signaling overhead may still be lower than the L3 and L1 signaling overhead required by multiple SPS configurations.

Figure 6:
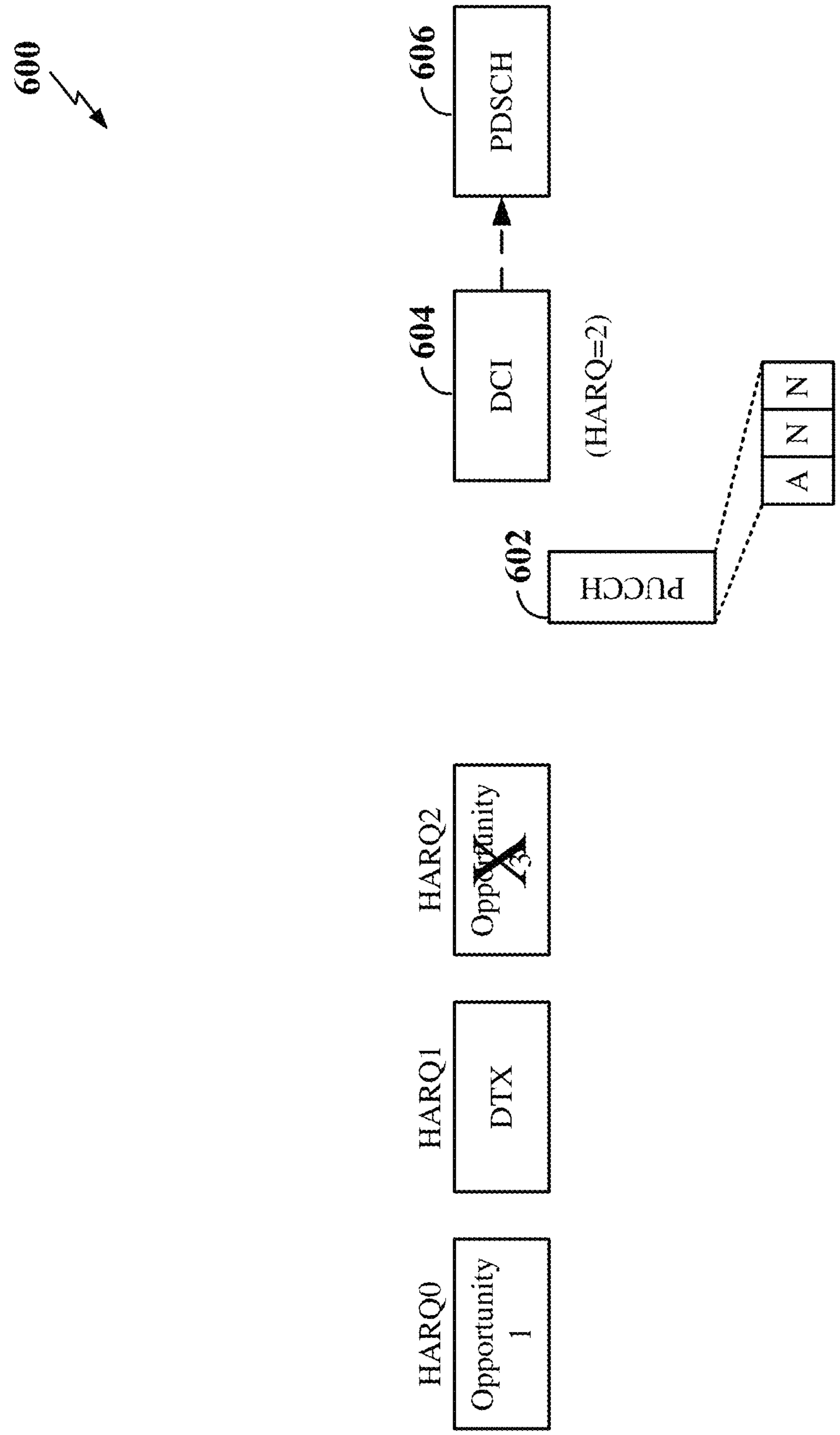
FIG. 6 is a conceptual illustration of an example of hybrid automatic repeat request (HARQ) processes for multiple communication opportunities of an SPS occasion according to some aspects of the disclosure.

FIG. 6 is a conceptual illustration of an example of hybrid automatic repeat request (HARQ) processes for multiple communication opportunities of an SPS occasion according to some aspects of the disclosure. Different HARQ processes (HARQ 0, HARQ 1, and HARQ 2) are used for the different communication opportunities. In this example, all of the communication opportunities are configured/activated with the same amount of radio resources for a homogeneous initial transmission. That is, the communication opportunities are simply shifted in time. In addition, the UE uses a single PUCCH to transmit s-bit A/N feedback.

In this example, the base station sends data via the first communication opportunity (opportunity 1) and the third communication opportunity (opportunity 3). The second communication opportunity is a discontinuous transmission (DTX). Since the UE was able to decode the first communication opportunity but was unable to decode the second and third communication opportunities, the UE sends corresponding (A/N) feedback in the PUCCH 602 as shown in FIG. 6. In response, the base station schedules a retransmission for the third communication opportunity. Specifically, the base station sends a DCI 604 that schedules the retransmission for HARQ2 in a PDSCH 606.

Figure 7:
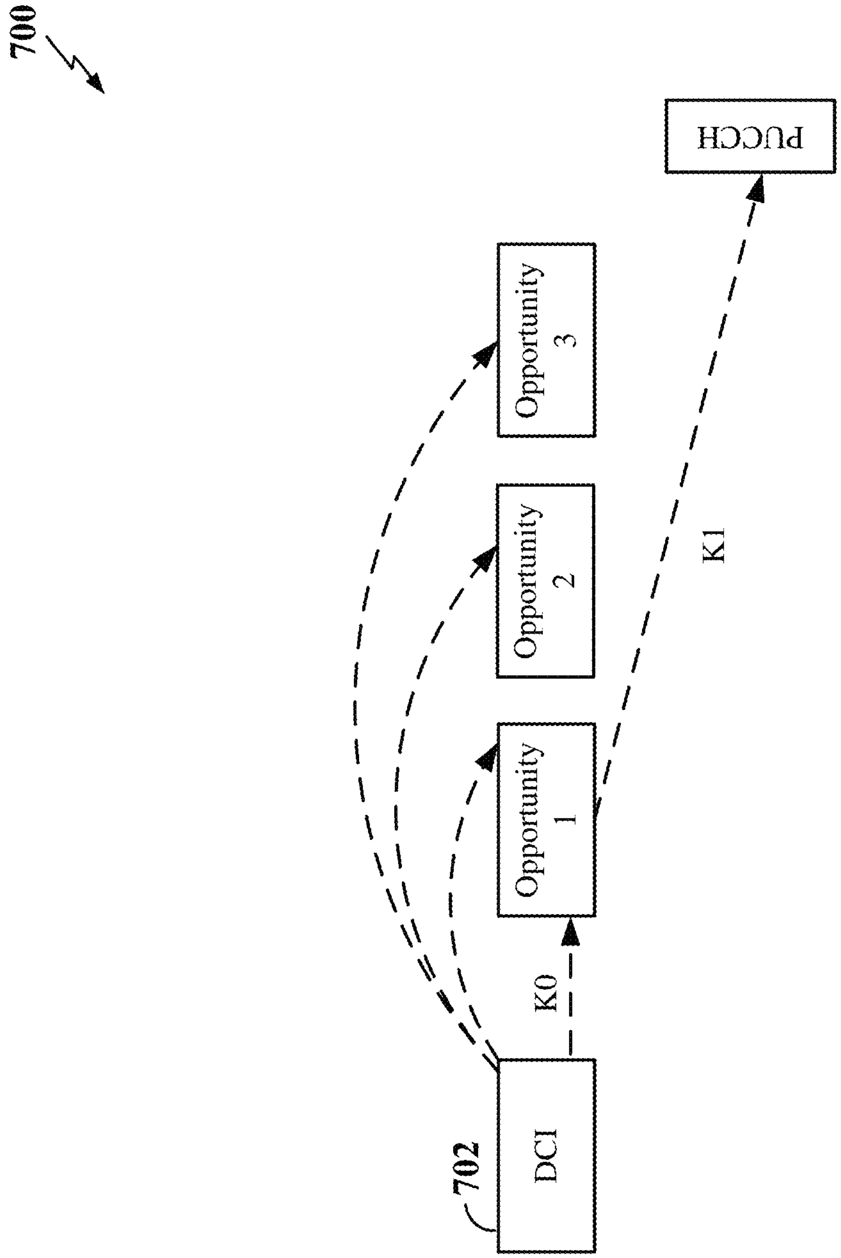
FIG. 7 is a conceptual illustration of an example of a downlink control information (DCI) activating/re-activating multiple communication opportunities of an SPS occasion according to some aspects of the disclosure.

The multi-opportunity SPS of FIG. 6 may be activated/de-activated by a compact-size DCI. FIG. 7 is a conceptual illustration of an example of a DCI activating/re-activating multiple communication opportunities of an SPS occasion according to some aspects of the disclosure. In this example, the SLIV applies to all s slots (i.e., all communication opportunities use the same SLIV) starting from the slot indicated by K0 in the SPS activation DCI 702. In addition, the communication opportunities use the same FDRA, the same MCS(s), and the same TCI in this example. The indicated K1 timing can be with respect to the first communication opportunity (as shown in FIG. 7) or the last communication opportunity.

Figure 8:
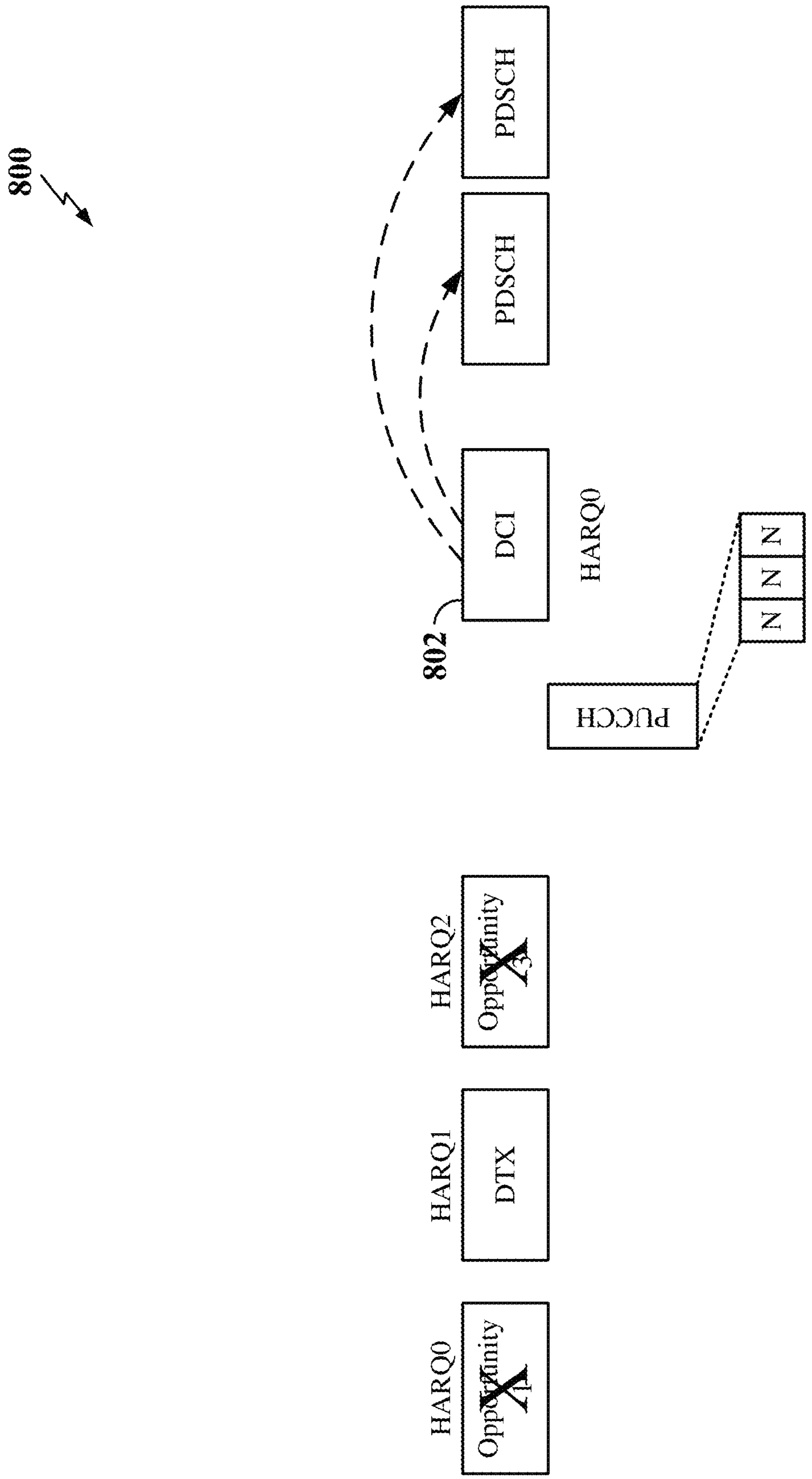
FIG. 8 is a conceptual illustration of an example of HARQ feedback and HARQ retransmission scheduling for multiple communication opportunities in an SPS occasion according to some aspects of the disclosure.

FIG. 8 is a conceptual illustration of an example of HARQ feedback and HARQ retransmission scheduling for multiple communication opportunities in an SPS occasion according to some aspects of the disclosure. After receiving multiple NACKs, a base station can use a composite DCI 802 to schedule multiple PDSCH retransmissions. To reduce overhead, the composite DCI 802 may have a single CRC, a common MCS (e.g., since the retransmissions are towards the same UE), a common FDRA, a common TCI, and/or the same SLIV in different slots.

The DCI 802 may include an incremental HARQ process ID wrap-around within the HARQ process ID space of the SPS. The DCI 802 may include a new data indicator (NDI) to indicate which communication opportunity is retransmitted due to the continuous HARQ ID restriction. This may assume a pre-configured redundancy vector (RV) sequence. In the example of FIG. 8, 4 bits (e.g., 2 bits for HARQ process ID=0 and 2 bits for the NDI-based re-transmission indication for remaining HARQ processes) may be used to indicate a retransmission to HARQ 0 and to HARQ2.

Figure 9:
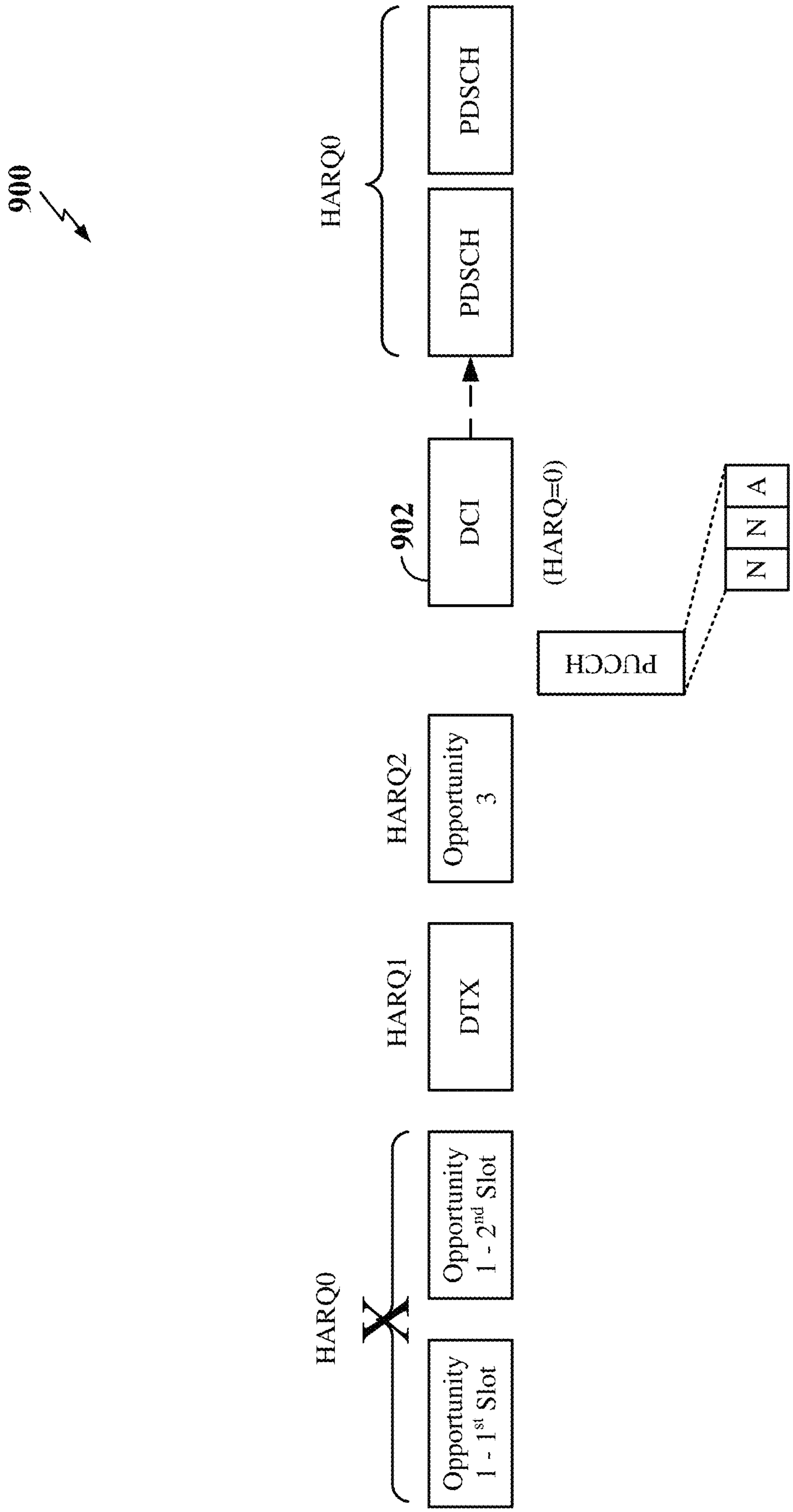
FIG. 9 is a conceptual illustration of an example of a HARQ process covering a multi-slot communication opportunity of an SPS occasion according to some aspects of the disclosure.

As an alternative to the homogeneous approach of FIG. 8, an SPS may have heterogeneous (with respect to the radio resource allocation) communication opportunities within an SPS occasion. FIG. 9 is a conceptual illustration of an example of a HARQ process (HARQO in this example) covering a multi-slot communication opportunity of an SPS occasion according to some aspects of the disclosure. In particular, FIG. 9 illustrates that the first communication opportunity supports slot-aggregation over two slots. Slot-aggregation over more than two slots could be used as well.

In the example of FIG. 9, a retransmission DG (e.g., in the DCI 902) for the same HARQ ID may apply the same-level of slot aggregation. Other examples of heterogenous operation include the use of different MCSs, or the use of different SLIVs, or both. In some aspects, heterogenous operation may involve the use of a larger DCI for activation/re-activation (e.g., to specify different parameters for different communication opportunities).

Figure 10:
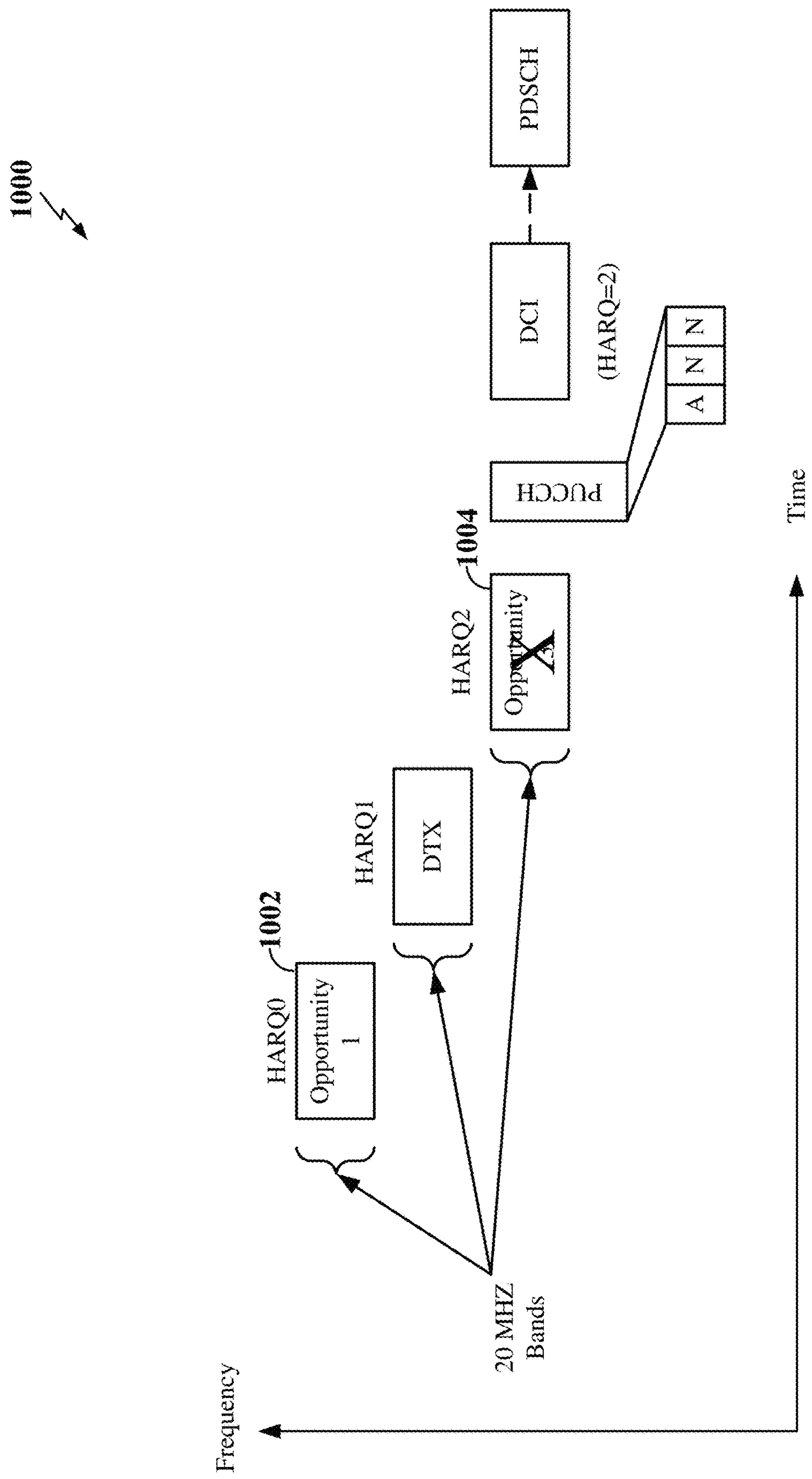
FIG. 10 is a conceptual illustration of an example of transmitting different communication opportunities of an SPS occasion via different radio frequency (RF) bands according to some aspects of the disclosure.

NR operation in an unlicensed band may be referred to as NR-U. For a reduced capability NR-U UE with an operating BW≤20 MHz and served by a wide-band (e.g., 80 MHz BW) base station, the communication opportunities of an SPS occasion can be heterogeneous with respect to the transmission frequency band. By using different LBT bandwidth for the communication opportunities, listen-before-talk (LBT) uncertainty at the base station may be mitigated. The FDRAs (e.g., the frequency bands) of the respective communication opportunities may be set/reset by the DCI activation/re-activation. FIG. 10 is a conceptual illustration of an example of transmitting different communication opportunities of an SPS occasion via different radio frequency (RF) bands according to some aspects of the disclosure. In this example, a base station transmits communication opportunity 1 1002 in one RF band and transmits communication opportunity 3 1004 in another RF band. Thus, for different communication opportunities, a UE may monitor different RF bands.

Figure 11:
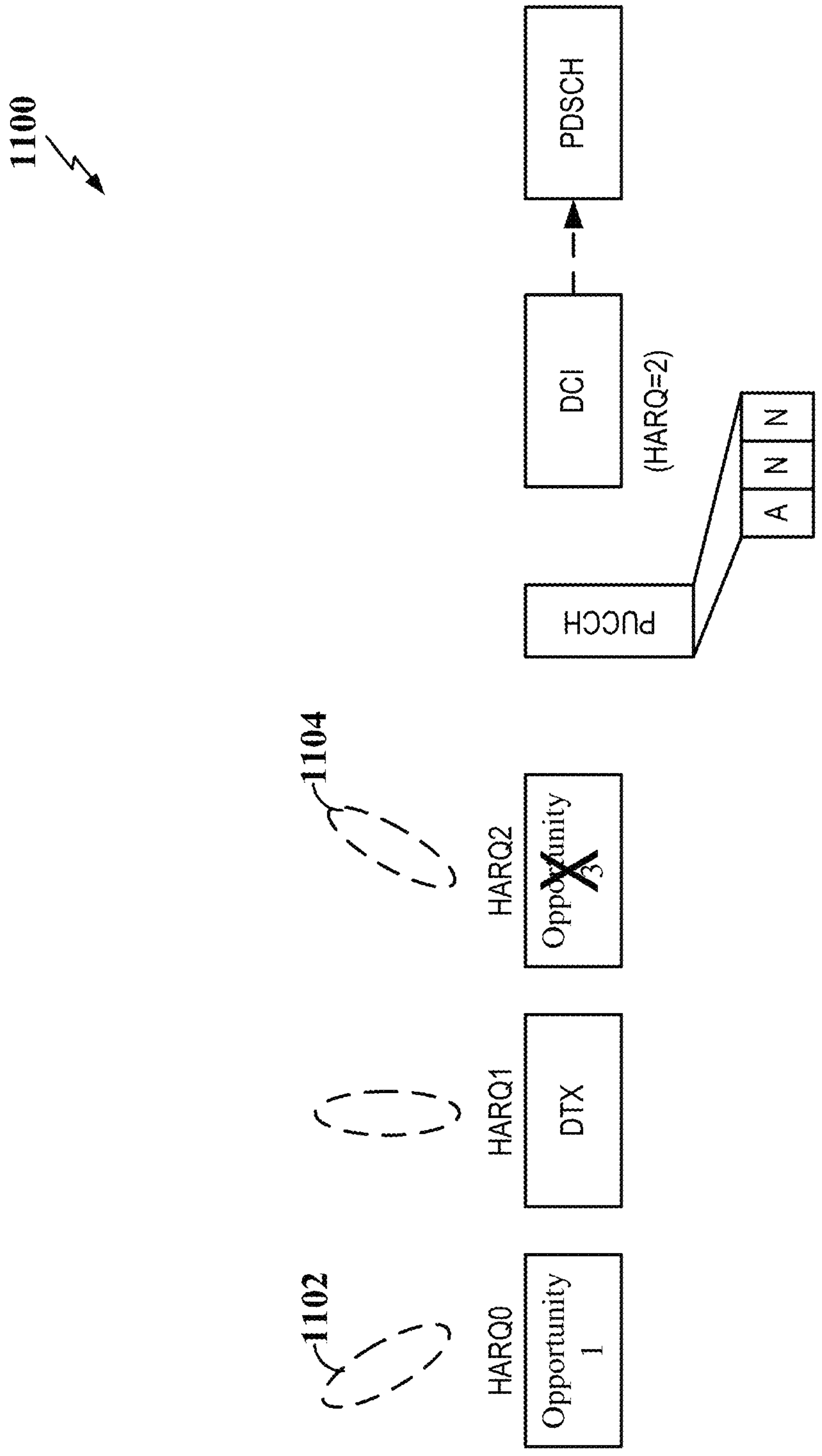
FIG. 11 is a conceptual illustration of an example of transmitting different communication opportunities of an SPS occasion via different RF beams according to some aspects of the disclosure.

For a UE in FR2 (or some other mmW band), the communication opportunities of an SPS occasion can be heterogenous in the spatial domain (e.g., a UE can tune to different beams transmitted by the base station). The beams to be used may be set/reset by DCI activations/re-activations. FIG. 11 is a conceptual illustration of an example of transmitting different communication opportunities of an SPS occasion via different RF beams according to some aspects of the disclosure. In this example, a base station transmits communication opportunity 1 via a one RF beam 1102 and transmits communication opportunity 3 via another RF beam 1104. Thus, for different communication opportunities, a UE may monitor different spatial domains.

As discussed above, the disclosure relates in some aspects to the use of communication sub-opportunities. For example, t (t≥1) sub-opportunities may be defined per communication opportunity. Among t communication sub-opportunities, a base station may elect to transmit on one of the sub-opportunities per communication opportunity in some examples. A base station may elect to transmit on more than one of the sub-opportunities per communication opportunity in other examples. For each communication opportunity, a UE may perform blind decoding at each sub-opportunity. In some examples, a UE may select the sub-opportunity with the largest likelihood of PDSCH decoding for HARQ combination.

Through the use of communication sub-opportunities, a UE may be configured with a massive-opportunity DL SPS. A base station may transmit a TB over any sub-opportunity (not being limited to one). One HARQ process may be used for each sub-opportunity. A UE may report s*t A/Ns per SPS occasion.

The above communication sub-opportunities may be allocated with different FDRAs. This may be used for frequency domain diversity (including different component carriers (CCs)). For example, different communication sub-opportunities may be used at different LBT BWs to mitigate LBT un-certainties in the unlicensed band. A DCI may be sent over a CC to activate/re-activate communication sub-opportunities in other CCs. The communication sub-opportunities discussed herein may be allocated to different beams (e.g., through the use of different antenna ports or different TCIs). The communication sub-opportunities discussed herein be allocated to different FDRAs and different beams.

Figure 12:
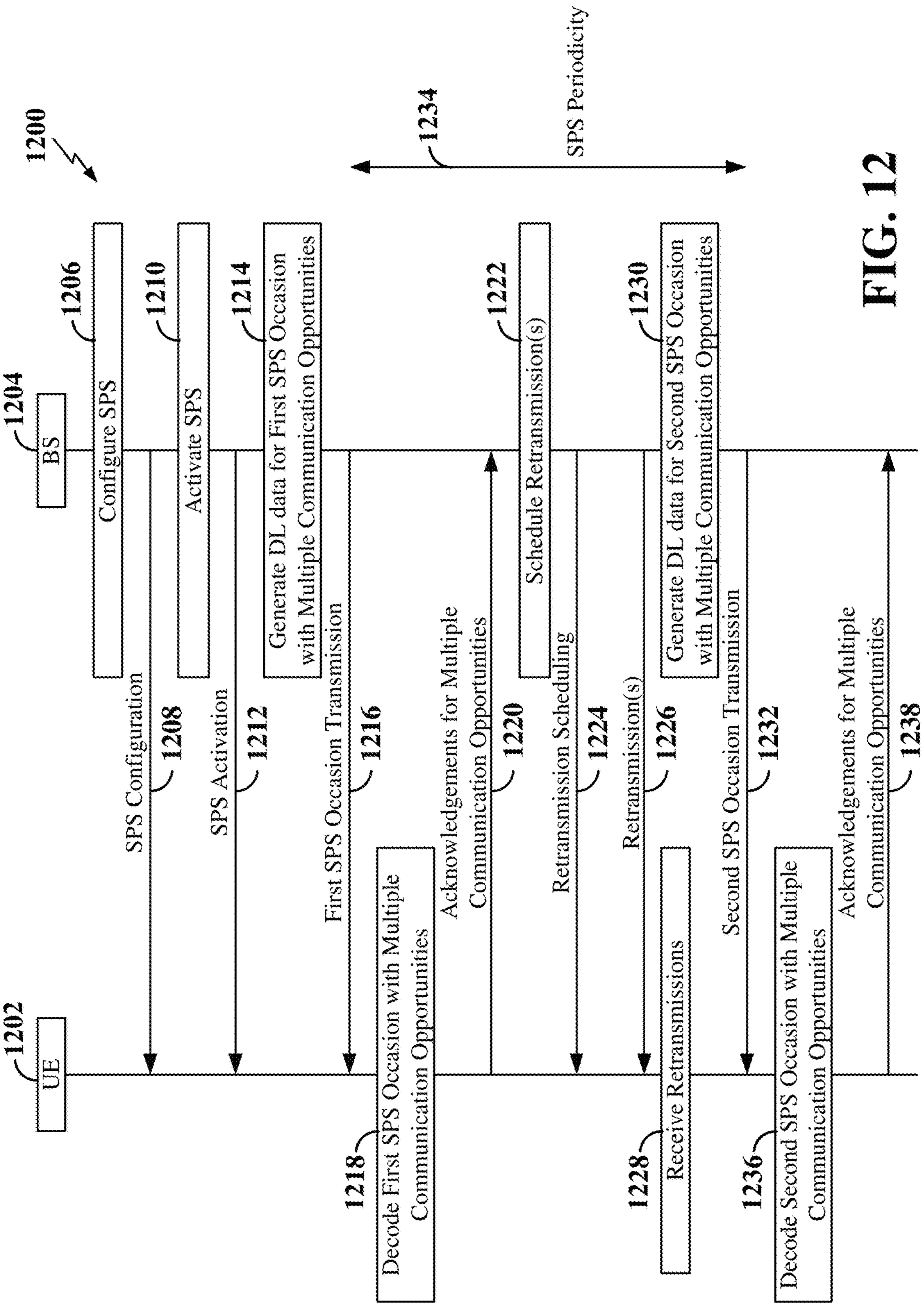
FIG. 12 is a signaling diagram illustrating SPS communication according to some aspects of the disclosure.

FIG. 12 is a signaling diagram illustrating SPS communication 1200 in a wireless communication network including a UE 1202 and a BS 1204. In some examples, the UE 1202 may correspond to one or more of the scheduled entity 126 (e.g., a UE, etc.) of FIG. 1, or the UE 222, 224, 226, 228, 230, 232, 234, 238, 240, or 242 of FIG. 2. In some examples, the BS 1204 may correspond to one or more of the scheduling entity 128 of FIG. 1, or the base station 210, 212, 214, or 216 of FIG. 2.

At step 1206 of FIG. 12, the BS 1204 configures an SPS. In some examples, the SPS configuration may specify that each SPS occasion includes multiple communication opportunities.

At step 1208, the BS 1204 transmits an RRC message that includes the SPS configuration.

At step 1210, the BS 1204 activates the SPS.

At step 1212, the BS 1204 sends a DCI to the UE 1202 indicating that the configured SPS is being activated. In some examples, the DCI may specify that data may be sent in multiple communication opportunities of an SPS occasion.

At step 1214, the BS 1204 generates DL data for a first SPS occasion that includes multiple communication opportunities.

At step 1216, the BS 1204 transmits the first SPS occasion. The first SPS occasion includes data in multiple communication opportunities (e.g., as discussed herein).

At step 1218, the UE 1202 decodes the first SPS occasion and determines whether each communication opportunity was successfully decoded. For example, the UE 1032 may conduct a separate HARQ process for each communication opportunity.

At step 1220, the UE 1202 sends a PUCCH message that includes a corresponding acknowledgement (e.g., a positive acknowledgement (ACK) or a negative acknowledgement (NACK) for each communication opportunity.

At step 1222, if the PUCCH included any NACKs, the BS 1204 schedules a retransmission for each corresponding communication opportunity.

At step 1224, if applicable, the BS 1204 sends a DCI that schedules a corresponding retransmission for each communication opportunity that was NACKed.

At step 1226, if applicable, the BS 1204 transmits each scheduled retransmission (e.g., on PDSCH).

At step 1228, if applicable, the UE 1202 receives and decodes each scheduled retransmission (e.g., on PDSCH). The above HARQ process may repeat, as need, if the UE 1202 has not successfully decoded all of the communication opportunities that include data.

At step 1230, the BS 1204 generates DL data for a second SPS occasion that includes multiple communication opportunities.

At step 1232, the BS 1204 transmits the second SPS occasion. The second SPS occasion includes data in multiple communication opportunities (e.g., as discussed herein). As represented by the line 1234, the BS 1204 transmits the second SPS occasion (relative to the first SPS occasion) according to the SPS periodicity specified by the SPS configuration.

At step 1236, the UE 1202 decodes the second SPS occasion and determines whether each communication opportunity was successfully decoded. Again, the UE 1032 may conduct a separate HARQ process for each communication opportunity.

At step 1238, the UE 1202 sends a PUCCH message that includes a corresponding acknowledgement (e.g., an ACK or a NACK) for each communication opportunity.

Figure 13:
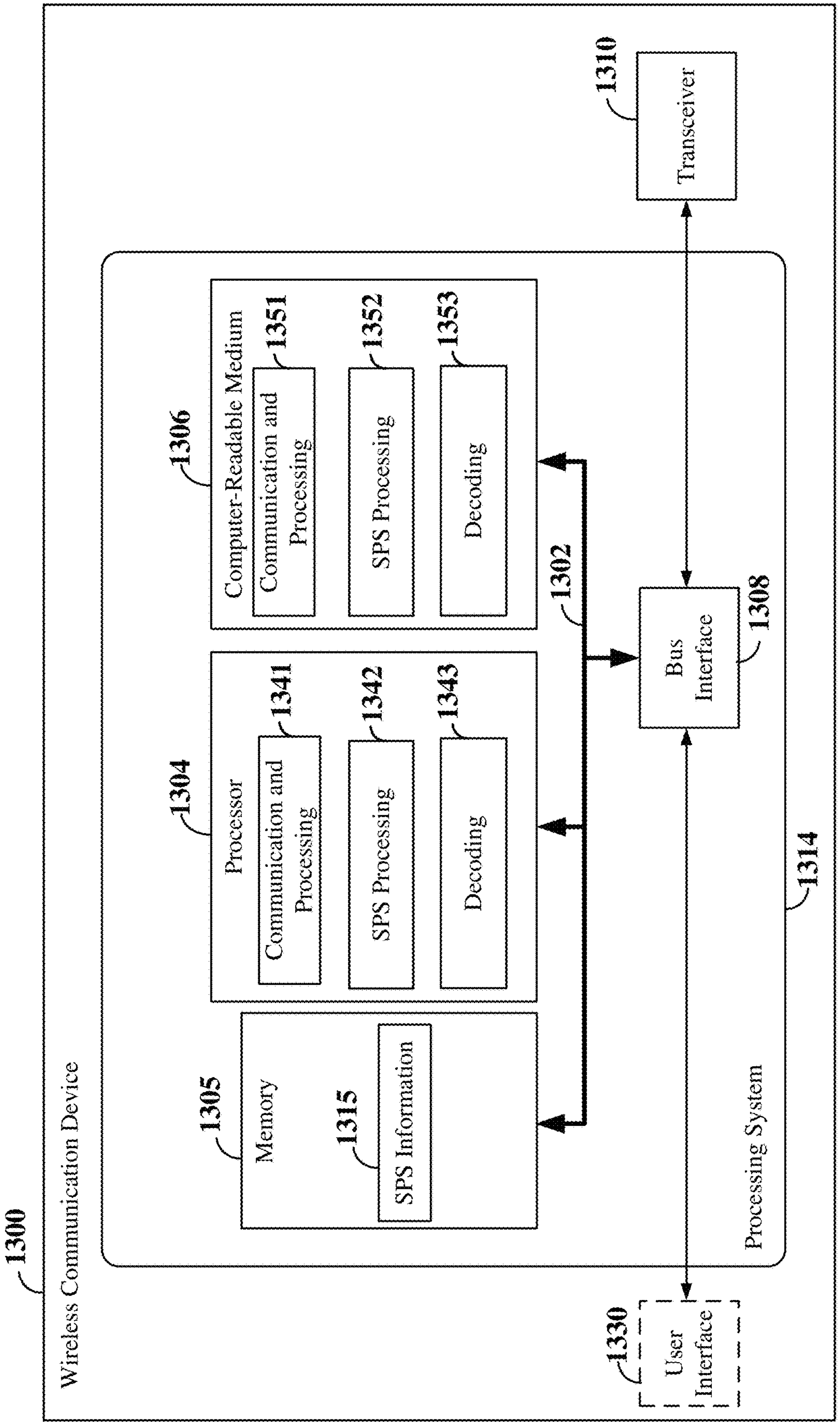
FIG. 13 is a block diagram conceptually illustrating an example of a hardware implementation for a wireless communication device employing a processing system according to some aspects of the disclosure.

FIG. 13 is a diagram illustrating an example of a hardware implementation for a wireless communication device 1300 employing a processing system 1314. For example, the wireless communication device 1300 may be a user equipment (UE) or other device configured to wirelessly communicate with a base station, as discussed in any one or more of FIGS. 1-12. In accordance with various aspects of the disclosure, an element, or any portion of an element, or any combination of elements may be implemented with a processing system 1314 that includes one or more processors 1304. In some implementations, the wireless communication device 1300 may correspond to one or more of the scheduled entity 106 (e.g., a UE, etc.) of FIG. 1, the UE 222, 224, 226, 228, 230, 232, 234, 238, 240, or 242 of FIG. 2, or the UE 1202 of FIG. 12.

The wireless communication device 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1300 may be configured to perform any one or more of the functions described herein. That is, the processor 1304, as utilized in a wireless communication device 1300, may be used to implement any one or more of the processes and procedures described below.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and between the bus 1302 and an interface 1330. The transceiver 1310 provides a communication interface or means for communicating with various other apparatus over a wireless transmission medium. In some examples, the wireless communication device may include two or more transceivers 1310, each configured to communicate with a respective network type (e.g., terrestrial or non-terrestrial). The interface 1330 provides a communication interface or means of communicating with various other apparatuses and devices (e.g., other devices housed within the same apparatus as the wireless communication device or other external apparatuses) over an internal bus or external transmission medium, such as an Ethernet cable. Depending upon the nature of the apparatus, the interface 1330 may include a user interface (e.g., keypad, display, speaker, microphone, joystick). Of course, such a user interface is optional, and may be omitted in some examples, such as an IoT device.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The wireless communication device 1300 may be configured to perform any one or more of the operations described herein (e.g., as described above in conjunction with FIGS. 1-12 and as described below in conjunction with FIG. 14). In some aspects of the disclosure, the processor 1304, as utilized in the wireless communication device 1300, may include circuitry configured for various functions.

The processor 1304 may include communication and processing circuitry 1341. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains, each configured to process signals in a different RAT (or RAN) type. The communication and processing circuitry 1341 may further be configured to execute communication and processing software 1351 included on the computer-readable medium 1306 to implement one or more functions described herein.

In some implementations where the communication involves receiving information, the communication and processing circuitry 1341 may obtain information from a component of the wireless communication device 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving.

In some implementations where the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., means for transmitting).

The processor 1304 may include SPS processing circuitry 1342 configured to perform SPS processing-related operations as discussed herein (e.g., determining the configuration of the communication opportunities or sub-opportunities to be used per SPS occasion). The SPS processing circuitry 1342 may include functionality for a means for receiving an SPS message. The SPS processing circuitry 1342 may further be configured to execute SPS processing software 1352 included on the computer-readable medium 1306 to implement one or more functions described herein.

The processor 1304 may include decoding circuitry 1343 configured to perform decoding-related operations as discussed herein. The decoding circuitry 1343 may include functionality for a means for decoding downlink information (e.g., decoding communication opportunities or sub-opportunities). The decoding circuitry 1343 may further be configured to execute decoding software 1353 included on the computer-readable medium 1306 to implement one or more functions described herein.

Figure 14:
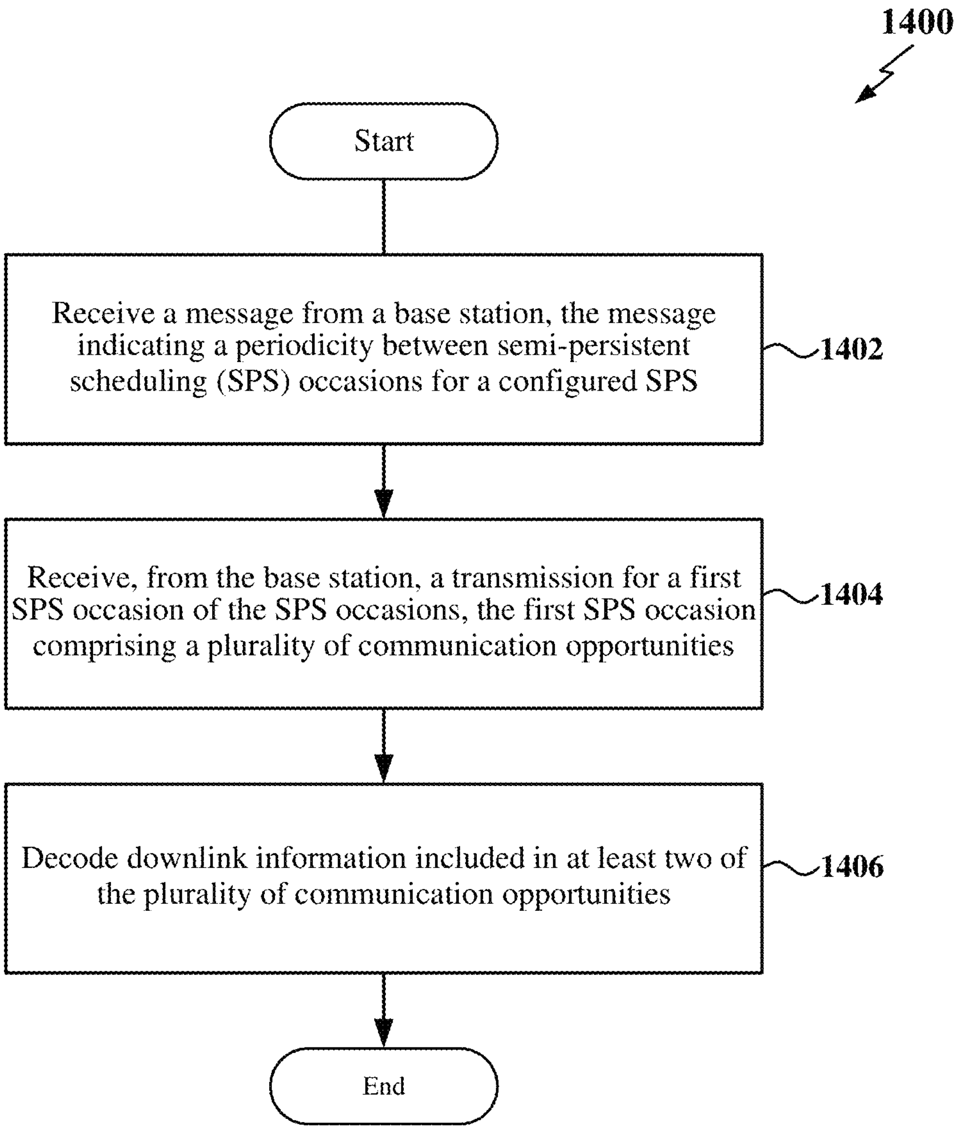
FIG. 14 is a flow chart illustrating an example wireless communication process for SPS communication according to some aspects of the disclosure.

FIG. 14 is a flow chart illustrating an example process 1400 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the wireless communication device 1300 illustrated in FIG. 13. In some aspects, the wireless communication device may be a user equipment. In some examples, the process 1400 may be carried out by any suitable apparatus or means for carrying out the functions or algorithm described below.

At block 1402, a wireless communication device may receive a message from a base station, the message indicating a periodicity between semi-persistent scheduling (SPS) occasions for a configured SPS. For example, the SPS processing circuitry 1342 in cooperation with the communication and processing circuitry 1341 and the transceiver 1310, shown and described above in connection with FIG. 13, may receive an RRC message from a base station, where the RRC message schedules an SPS.

At block 1404, the wireless communication device may receive, from the base station, a transmission for a first SPS occasion of the SPS occasions, the first SPS occasion including a plurality of communication opportunities. For example, the SPS processing circuitry 1342 in cooperation with the communication and processing circuitry 1341 and the transceiver 1310, shown and described above in connection with FIG. 13, may receive an SPS occasion (according to the SPS periodicity) from a base station, where the SPS occasion includes multiple communication opportunities.

At block 1406, the wireless communication device may decode downlink information included in at least two of the plurality of communication opportunities. For example, the decoding circuitry 1343, shown and described above in connection with FIG. 13, may decode an SPS occasion to recover information included in multiple communication opportunities of the SPS occasion.

In some examples, the downlink information may include first information in a first communication opportunity of the plurality of communication opportunities and second information in a second communication opportunity of the plurality of communication opportunities. The first communication opportunity may include a first communication sub-opportunity and the second communication opportunity may include a second communication sub-opportunity.

In some examples, the process may further include conducting a first hybrid automatic repeat request (HARQ) process for the first information and conducting a second HARQ process for the second information in the second communication opportunity. In some examples, the process may further include transmitting, to the base station, a physical uplink control channel (PUSCH) message that includes a first acknowledgement for the first information; and a second acknowledgement for the second information. In some aspects, the process may further include receiving a downlink control information (DCI) from the base station after transmitting the PUSCH message. The DCI may indicate at least one of a first resource for a retransmission of the first information; a second resource for a retransmission of the second information, or a combination thereof.

In some examples, the first information is for a first transport block and the second information is for a second transport block. In some examples, the first communication opportunity is two slots in length and the second communication opportunity is one slot in length. In some examples, the process may further include generating a first acknowledgement for the first information and generating a second acknowledgement for the second information.

In some examples, receiving, from the base station, the transmission for the first SPS occasion of the SPS occasions may include receiving the first information in the first communication opportunity on a first radio frequency (RF) band and receiving the second information in the second communication opportunity on a second RF band that is different from the first RF band. In some examples, receiving, from the base station, the transmission for the first SPS occasion of the SPS occasions may include receiving the first information in the first communication opportunity via a first (RF) beam and receiving the second information in the second communication opportunity on a second RF beam that is different from the first RF beam.

In some examples, the first communication opportunity and the second communication opportunity may include a plurality of communication sub-opportunities and decoding downlink information included in at least two of the plurality of communication opportunities may include decoding information included in at least two of the plurality of communication sub-opportunities. In some examples, the process may further include conducting a first hybrid automatic repeat request (HARQ) process for a first communication sub-opportunity of the plurality of communication sub-opportunities; and conducting a second HARQ process for a second communication sub-opportunity of the plurality of communication sub-opportunities. In some examples, receiving, from the base station, the transmission for the first SPS occasion of the SPS occasions may include receiving the first information in the first communication sub-opportunity on a first radio frequency (RF) band and receiving the second information in the second communication sub-opportunity on a second RF band that is different from the first RF band. In some examples, receiving, from the base station, the transmission for the first SPS occasion of the SPS occasions may include receiving the first information in the first communication sub-opportunity via a first (RF) beam and receiving the second information in the second communication sub-opportunity on a second RF beam that is different from the first RF beam.

In some examples, the process may further include receiving a downlink control information (DCI) from the base station. The DCI may indicate at least one of a start and length indicator (SLIV) for the plurality of communication opportunities, a frequency domain resource allocation (FDRA) for the plurality of communication opportunities, a time domain resource allocation (TDRA) for the plurality of communication opportunities, a modulation and coding scheme (MCS) for the plurality of communication opportunities, a transmission configuration indicator (TCI) for the plurality of communication opportunities, or any combination thereof.

In some examples, the process may further include receiving a downlink control information (DCI) from the base station. The DCI may indicate at least one of a first start and length indicator (SLIV) for the first communication opportunity and a second SLIV that is different from the first SLIV for the second communication opportunity, a first frequency domain resource allocation (FDRA) for the first communication opportunity and a second FDRA that is different from the first FDRA for the second communication opportunity, a first time domain resource allocation (TDRA) for the first communication opportunity and a second TDRA that is different from the first TDRA for the second communication opportunity, a first modulation and coding scheme (MCS) for the first communication opportunity and a second MCS that is different from the first MCS for the second communication opportunity, a first transmission configuration indicator (TCI) for the first communication opportunity and a second TCI that is different from the first TCI for the second communication opportunity, any combination thereof.

Figure 15:
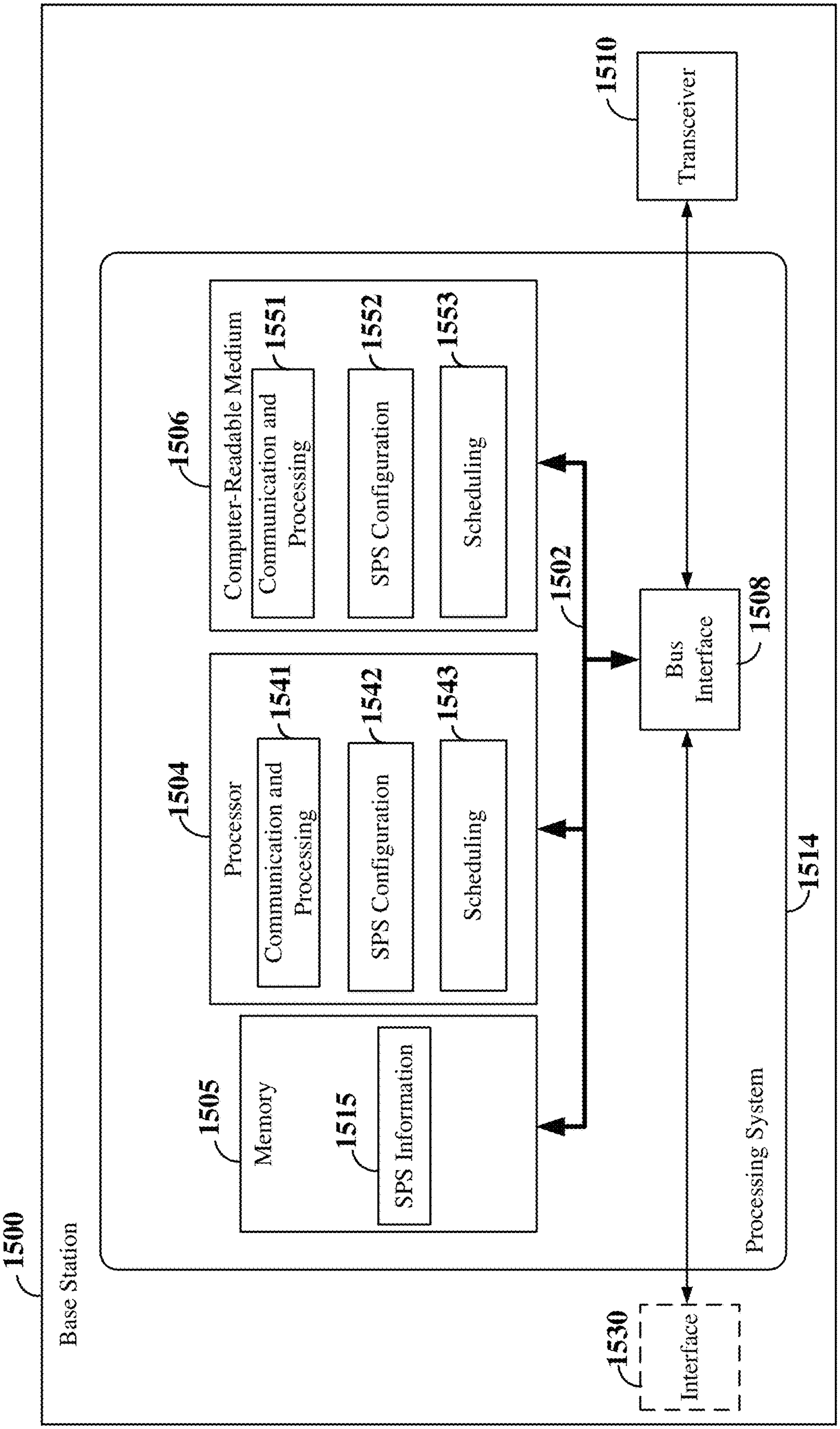
FIG. 15 is a block diagram conceptually illustrating an example of a hardware implementation for a base station employing a processing system according to some aspects of the disclosure.

FIG. 15 is a conceptual diagram illustrating an example of a hardware implementation for base station (BS) 1500 employing a processing system 1514. In accordance with various aspects of the disclosure, an element, or any portion of an element, or any combination of elements may be implemented with a processing system 1514 that includes one or more processors 1504. In some implementations, the BS 1500 may correspond to one or more of the scheduling entity 108 (e.g., a gNB, a transmit receive point, a UE, etc.) of FIG. 1, the base station 210, 212, 214, or 218 of FIG. 2, or the BS 1204 of FIG. 12.

The processing system 1514 may be substantially the same as the processing system 1314 illustrated in FIG. 13, including a bus interface 1508, a bus 1502, memory 1505, a processor 1504, and a computer-readable medium 1506. Furthermore, the BS 1500 may include an interface 1530 (e.g., a network interface) that provides a means for communicating with at least one other apparatus within a core network and with at least one radio access network.

The BS 1500 may be configured to perform any one or more of the operations described herein (e.g., as described above in conjunction with FIGS. 1-12 and as described below in conjunction with FIG. 16). In some aspects of the disclosure, the processor 1504, as utilized in the BS 1500, may include circuitry configured for various functions.

In some aspects of the disclosure, the processor 1504 may include communication and processing circuitry 1541. The communication and processing circuitry 1541 may include one or more hardware components that provide the physical structure that performs various processes related to communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. The communication and processing circuitry 1541 may further be configured to execute communication and processing software 1551 included on the computer-readable medium 1506 to implement one or more functions described herein.

In some implementations where the communication involves receiving information, the communication and processing circuitry 1541 may obtain information from a component of the BS 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may include functionality for a means for receiving.

In some implementations where the communication involves sending (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may include functionality for a means for sending (e.g., means for transmitting).

The processor 1504 may include SPS configuration circuitry 1542 configured to perform SPS configuration-related operations as discussed herein (e.g., generating an SPS configuration and sending an RRC message indicating the SPS configuration). The SPS configuration circuitry 1542 may include functionality for a means for transmitting an message (e.g., an SPS configuration message and/or an SPS activation/deactivation message). The SPS configuration circuitry 1542 may further be configured to execute SPS configuration software 1552 included on the computer-readable medium 1506 to implement one or more functions described herein.

The processor 1504 may include scheduling circuitry 1543 configured to perform scheduling-related operations as discussed herein (e.g., sending a DCI that activates, deactivates, or reactivates SPS). The scheduling circuitry 1543 may include functionality for a means for transmitting a transmission (e.g., for an SPS occasion including a plurality of communication opportunities). The scheduling circuitry 1543 may further be configured to execute scheduling software 1553 included on the computer-readable medium 1506 to implement one or more functions described herein.

Figure 16:
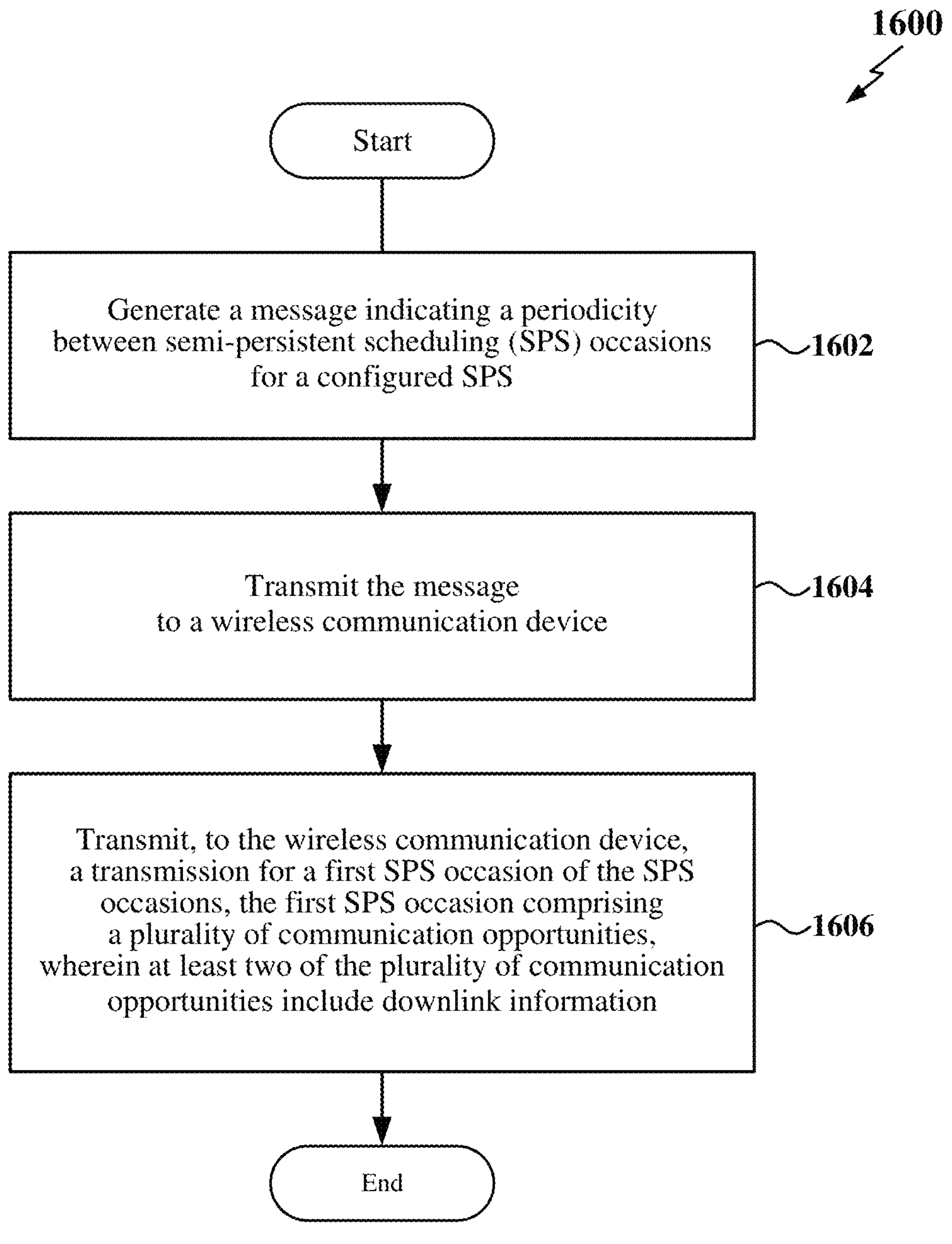
FIG. 16 is a flow chart illustrating an example wireless communication process for SPS communication according to some aspects of the disclosure.

FIG. 16 is a flow chart illustrating an example process 1600 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the base station 1500 illustrated in FIG. 15. In some examples, the process 1600 may be carried out by any suitable apparatus or means for carrying out the functions or algorithm described below.

At block 1602, a BS may generate a message indicating a periodicity between semi-persistent scheduling (SPS) occasions for a configured SPS. For example, the SPS configuration circuitry 1542, shown and described above in connection with FIG. 15, may generate an RRC message that schedules an SPS (e.g., for a cell and a BSP).

At block 1604, the BS may transmit the message to a wireless communication device. For example, the SPS configuration circuitry 1542 in cooperation with the communication and processing circuitry 1541 and the transceiver 1510, shown and described above in connection with FIG. 15, may broadcast, the RRC message, transmit the RRC message to the wireless communication device, or communicate the RRC message in some other way.

At block 1606, the BS may transmit, to the wireless communication device, a transmission for a first SPS occasion of the SPS occasions. The first SPS occasion may include a plurality of communication opportunities and at least two of the plurality of communication opportunities may include downlink information. For example, the scheduling circuitry 1543 in cooperation with the communication and processing circuitry 1541 and the transceiver 1510, shown and described above in connection with FIG. 15, may transmit an SPS occasion (according to the SPS periodicity), where the SPS occasion includes multiple communication opportunities.

In some examples, the downlink information may include first information in a first communication opportunity of the plurality of communication opportunities and second information in a second communication opportunity of the plurality of communication opportunities. The first communication opportunity may include a first communication sub-opportunity and the second communication opportunity may include a second communication sub-opportunity.

In some examples, the process may further include conducting a first hybrid automatic repeat request (HARQ) process for the first information and conducting a second HARQ process for the second information. In some examples, the process may further include receiving, from the wireless communication device, a physical uplink control channel (PUSCH) message that includes a first acknowledgement for the first information, and a second acknowledgement for the second information. In some examples, the process may further include, after receiving the PUSCH message, generating a composite a downlink control information (DCI) indicating a first resource for a first retransmission of the first information and second resource for a second retransmission of the second information and transmitting the DCI to the wireless communication device.

In some examples, the first information is for a first transport block and the second information is for a second transport block. In some examples, the first communication opportunity is two slots in length and the second communication opportunity is one slot in length. In some examples, the process may further include receiving, from the wireless communication device a first acknowledgement for the first information and a second acknowledgement for the second information.

In some examples, transmitting, to the wireless communication device, the transmission for the first SPS occasion of the SPS occasions may include transmitting the first information in the first communication opportunity on a first radio frequency (RF) band and transmitting the second information in the second communication opportunity on a second RF band that is different from the first RF band. In some examples, transmitting, to the wireless communication device, the transmission for the first SPS occasion of the SPS occasions may include transmitting the first information in the first communication opportunity via a first (RF) beam and transmitting the second information in the second communication opportunity on a second RF beam that is different from the first RF beam.

In some examples, the first communication opportunity and the second communication opportunity may include a plurality of communication sub-opportunities and transmitting, to the wireless communication device, the transmission for the first SPS occasion of the SPS occasions may include transmitting information in at least two of the plurality of communication sub-opportunities. In some examples, the process may further include conducting a first hybrid automatic repeat request (HARQ) process for a first communication sub-opportunity of the plurality of communication sub-opportunities and conducting a second HARQ process for a second communication sub-opportunity of the plurality of communication sub-opportunities. In some examples, transmitting, to the wireless communication device, the transmission for the first SPS occasion of the SPS occasions may include transmitting the first information in the first communication sub-opportunity on a first radio frequency (RF) band and transmitting the second information in the second communication sub-opportunity on a second RF band that is different from the first RF band. In some examples, transmitting, to the wireless communication device, the transmission for the first SPS occasion of the SPS occasions may include transmitting the first information in the first communication sub-opportunity via a first (RF) beam and transmitting the second information in the second communication sub-opportunity on a second RF beam that is different from the first RF beam.

In some examples, the process may further include transmitting a downlink control information (DCI) to the wireless communication device. The DCI may indicate at least one of a start and length indicator (SLIV) for the plurality of communication opportunities, a frequency domain resource allocation (FDRA) for the plurality of communication opportunities, a time domain resource allocation (TDRA) for the plurality of communication opportunities, a modulation and coding scheme (MCS) for the plurality of communication opportunities, a transmission configuration indicator (TCI) for the plurality of communication opportunities, or any combination thereof.

In some examples, the process may further include transmitting a downlink control information (DCI) to the wireless communication device. The DCI may indicate at least one of a first start and length indicator (SLIV) for the first communication opportunity and a second SLIV that is different from the first SLIV for the second communication opportunity, a first frequency domain resource allocation (FDRA) for the first communication opportunity and a second FDRA that is different from the first FDRA for the second communication opportunity, a first time domain resource allocation (TDRA) for the first communication opportunity and a second TDRA that is different from the first TDRA for the second communication opportunity, a first modulation and coding scheme (MCS) for the first communication opportunity and a second MCS that is different from the first MCS for the second communication opportunity, a first transmission configuration indicator (TCI) for the first communication opportunity and a second TCI that is different from the first TCI for the second communication opportunity, any combination thereof.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term “determining” may include, for example, ascertaining, resolving, selecting, choosing, establishing, calculating, computing, processing, deriving, investigating, looking up (e.g., looking up in a table, a database or another data structure), and the like. Also, “determining” may include receiving (e.g., receiving information), accessing (e.g., accessing data in a memory), and the like.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 12, 13, and 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication at a user equipment (UE), the method comprising:
- receiving a message from a network entity, the message indicating a periodicity between semi-persistent scheduling (SPS) occasions for a configured SPS;
- receiving, from the network entity, a transmission for a first SPS occasion of the SPS occasions, the first SPS occasion comprising a plurality of communication opportunities;
- decoding downlink information included in at least two of the plurality of communication opportunities of the first SPS occasion, wherein the downlink information comprises a first information in a first communication opportunity of the plurality of communication opportunities of the first SPS occasion, and wherein the downlink information further comprises a second information in a second communication opportunity and a third communication opportunity of the plurality of communication opportunities of the first SPS occasion;
- conducting a first hybrid automatic repeat request (HARQ) process associated with a first HARQ process ID for the first information in the first communication opportunity of the plurality of communication opportunities of the first SPS occasion; and
- conducting a second HARQ process associated with a second HARQ process ID for the second information in the second communication opportunity and the third communication opportunity of the plurality of communication opportunities of the first SPS occasion.

2. A user equipment (UE), comprising:
- a transceiver;
- one or more memories that store processor-executable code; and
- one or more processors configured to execute the processor-executable code and cause the UE to:
  - receive a message from a network entity via the transceiver, the message indicating a periodicity between semi-persistent scheduling (SPS) occasions for a configured SPS;
  - receive, from the network entity via the transceiver, a transmission for a first SPS occasion of the SPS occasions, the first SPS occasion comprising a plurality of communication opportunities;
  - decode downlink information included in at least two of the plurality of communication opportunities of the first SPS occasion, wherein the downlink information comprises a first information in a first communication opportunity of the plurality of communication opportunities of the first SPS occasion, and wherein the downlink information further comprises a second information in a second communication opportunity and a third communication opportunity of the plurality of communication opportunities of the first SPS occasion;
  - conduct a first hybrid automatic repeat request (HARQ) process associated with a first HARQ process ID for the first information in the first communication opportunity of the plurality of communication opportunities of the first SPS occasion; and
  - conduct a second HARQ process associated with a second HARQ process ID for the second information in the second communication opportunity and the third communication opportunity of the plurality of communication opportunities of the first SPS occasion.

3. The UE of claim 2, wherein the one or more processors are further configured to execute the processor-executable code and cause the UE to transmit, to the network entity, a physical uplink control channel (PUSCH) message comprising:
- a first acknowledgement for the first information; and
- a second acknowledgement for the second information.

4. The UE of claim 3, wherein the one or more processors are further configured to execute the processor-executable code and cause the UE to receive a downlink control information (DCI) from the network entity after transmitting the PUSCH message, the DCI indicating at least one of:
- a first resource for a retransmission of the first information;
- a second resource for a retransmission of the second information; or
- a combination thereof.

5. The UE of claim 2, wherein:
- the first information is for a first transport block; and
- the second information is for a second transport block.

6. The UE of claim 5, wherein:
- the first communication opportunity is two slots in length; and
- the second communication opportunity is one slot in length.

7. The UE of claim 6, wherein the one or more processors are further configured to execute the processor-executable code and cause the UE to:
- generate a first acknowledgement for the first information; and
- generate a second acknowledgement for the second information.

8. The UE of claim 2, wherein the one or more processors are further configured to execute the processor-executable code and cause the UE to:

receive the first information in the first communication opportunity on a first radio frequency (RF) band; and receive the second information in the second communication opportunity on a second RF band that is different from the first RF band.

9. The UE of claim 2, wherein the one or more processors are further configured to execute the processor-executable code and cause the UE to:

receive the first information in the first communication opportunity via a first (RF) beam; and receive the second information in the second communication opportunity on a second RF beam that is different from the first RF beam.

10. The UE of claim 2, wherein:

the first communication opportunity and the second communication opportunity each comprise a plurality of communication sub-opportunities; and the one or more processors are further configured to execute the processor-executable code and cause the UE to decode information included in at least two of the plurality of communication sub-opportunities.

11. The UE of claim 2, wherein:

the first communication opportunity and the second communication opportunity each comprise a plurality of communication sub-opportunities; and the one or more processors are further configured to execute the processor-executable code and cause the UE to:

conduct a third hybrid automatic repeat request (HARQ) process for a first communication sub-opportunity of the plurality of communication sub-opportunities; and conduct a fourth HARQ process for a second communication sub-opportunity of the plurality of communication sub-opportunities.

12. The UE of claim 2, wherein:

the first communication opportunity comprises a first communication sub-opportunity;

the second communication opportunity comprises a second communication sub-opportunity;

the one or more processors are further configured to execute the processor-executable code and cause the UE to receive the first information in the first communication sub-opportunity on a first radio frequency (RF) band; and the one or more processors are further configured to execute the processor-executable code and cause the UE to receive the second information in the second communication sub-opportunity on a second RF band that is different from the first RF band.

13. The UE of claim 2, wherein:

the first communication opportunity comprises a first communication sub-opportunity;

the second communication opportunity comprises a second communication sub-opportunity;

the one or more processors are further configured to execute the processor-executable code and cause the UE to receive the first information in the first communication sub-opportunity via a first (RF) beam; and the one or more processors are further configured to execute the processor-executable code and cause the UE to receive the second information in the second communication sub-opportunity on a second RF beam that is different from the first RF beam.

14. The UE of claim 2, wherein the one or more processors are further configured to execute the processor-executable code and cause the UE to receive a downlink control information (DCI) from the network entity, the DCI indicating at least one of:

a first start and length indicator (SLIV) for the first communication opportunity and a second SLIV that is different from the first SLIV for the second communication opportunity;

a first frequency domain resource allocation (FDRA) for the first communication opportunity and a second FDRA that is different from the first FDRA for the second communication opportunity;

a first time domain resource allocation (TDRA) for the first communication opportunity and a second TDRA that is different from the first TDRA for the second communication opportunity;

a first modulation and coding scheme (MCS) for the first communication opportunity and a second MCS that is different from the first MCS for the second communication opportunity;

a first transmission configuration indicator (TCI) for the first communication opportunity and a second TCI that is different from the first TCI for the second communication opportunity;

any combination thereof.

15. The UE of claim 2, wherein the one or more processors are further configured to execute the processor-executable code and cause the UE to receive a downlink control information (DCI) from the network entity, the DCI indicating at least one of:

a start and length indicator (SLIV) for the plurality of communication opportunities;

a frequency domain resource allocation (FDRA) for the plurality of communication opportunities;

a time domain resource allocation (TDRA) for the plurality of communication opportunities;

a modulation and coding scheme (MCS) for the plurality of communication opportunities;

a transmission configuration indicator (TCI) for the plurality of communication opportunities; or any combination thereof.

16. A method of wireless communication at a network entity, the method comprising:

generating a message indicating a periodicity between semi-persistent scheduling (SPS) occasions for a configured SPS;

transmitting the message to a UE;

transmitting, to the UE, downlink information for a first SPS occasion of the SPS occasions, the first SPS occasion comprising a plurality of communication opportunities, wherein the downlink information comprises a first information in a first communication opportunity of the plurality of communication opportunities of the first SPS occasion, and wherein the downlink information further comprises a second information in a second communication opportunity and a third communication opportunity of the plurality of communication opportunities of the first SPS occasion; and conducting a first hybrid automatic repeat request (HARQ) process associated with a first HARQ process ID for the first information in the first communication opportunity of the plurality of communication opportunities of the first SPS occasion; and conducting a second HARQ process associated with a second HARQ process ID for the second information in the second communication opportunity and the third communication opportunity of the plurality of communication opportunities of the first SPS occasion.

17. A network entity, comprising:
a transceiver;
one or more memories that store processor-executable code; and
one or more processors configured to execute the processor-executable code and cause the network entity to:
generate a message indicating a periodicity between semi-persistent scheduling (SPS) occasions for a configured SPS;
transmit the message to a UE via the transceiver;
transmit, to the UE via the transceiver, downlink information for a first SPS occasion of the SPS occasions, the first SPS occasion comprising a plurality of communication opportunities, wherein the downlink information comprises a first information in a first communication opportunity of the plurality of communication opportunities of the first SPS occasion, and wherein the downlink information further comprises a second information in a second communication opportunity and a third communication opportunity of the plurality of communication opportunities of the first SPS occasion;
conduct a first hybrid automatic repeat request (HARQ) process associated with a first HARQ process ID for the first information in the first communication opportunity of the plurality of communication opportunities of the first SPS occasion; and
conduct a second HARQ process associated with a second HARQ process ID for the second information in the second communication opportunity and the third communication opportunity of the plurality of communication opportunities of the first SPS occasion.

18. The network entity of claim 17, wherein the one or more processors are further configured to execute the processor-executable code and cause the network entity to receive, from the UE, a physical uplink control channel (PUSCH) message comprising:
a first acknowledgement for the first information; and
a second acknowledgement for the second information.

19. The network entity of claim 18, wherein the one or more processors are further configured to execute the processor-executable code and cause the network entity to, after receiving the PUSCH message:
generate a composite a downlink control information (DCI) indicating a first resource for a first retransmission of the first information and second resource for a second retransmission of the second information; and
transmit the DCI to the UE.

20. The network entity of claim 17, wherein:
the first information is for a first transport block; and
the second information is for a second transport block.

21. The network entity of claim 20, wherein:
the first communication opportunity is two slots in length; and
the second communication opportunity is one slot in length.

22. The network entity of claim 21, wherein the one or more processors are further configured to execute the processor-executable code and cause the network entity to receive, from the UE:
a first acknowledgement for the first information; and
a second acknowledgement for the second information.

23. The network entity of claim 17, wherein the one or more processors are further configured to execute the processor-executable code and cause the network entity to:
transmit the first information in the first communication opportunity on a first radio frequency (RF) band; and
transmit the second information in the second communication opportunity on a second RF band that is different from the first RF band.

24. The network entity of claim 17, wherein the one or more processors are further configured to execute the processor-executable code and cause the network entity to:
transmit the first information in the first communication opportunity via a first (RF) beam; and
transmit the second information in the second communication opportunity on a second RF beam that is different from the first RF beam.

25. The network entity of claim 17, wherein:
the first communication opportunity and the second communication opportunity comprise a plurality of communication sub-opportunities; and
the one or more processors are further configured to execute the processor-executable code and cause the network entity to transmit information in at least two of the plurality of communication sub-opportunities.

26. The network entity of claim 17, wherein:
the first communication opportunity and the second communication opportunity comprise a plurality of communication sub-opportunities; and
the one or more processors are further configured to execute the processor-executable code and cause the network entity to:
conduct a third hybrid automatic repeat request (HARQ) process for a first communication sub-opportunity of the plurality of communication sub-opportunities; and
conduct a fourth HARQ process for a second communication sub-opportunity of the plurality of communication sub-opportunities.

27. The network entity of claim 17, wherein:
the first communication opportunity comprises a first communication sub-opportunity;
the second communication opportunity comprises a second communication sub-opportunity;
the one or more processors are further configured to execute the processor-executable code and cause the network entity to transmit the first information in the first communication sub-opportunity on a first radio frequency (RF) band; and
the one or more processors are further configured to execute the processor-executable code and cause the network entity to transmit the second information in the second communication sub-opportunity on a second RF band that is different from the first RF band.

28. The network entity of claim 17, wherein:
the first communication opportunity comprises a first communication sub-opportunity;
the second communication opportunity comprises a second communication sub-opportunity;
the one or more processors are further configured to execute the processor-executable code and cause the network entity to transmit the first information in the first communication sub-opportunity via a first (RF) beam; and
the one or more processors are further configured to execute the processor-executable code and cause the network entity to transmit the second information in the second communication sub-opportunity on a second RF beam that is different from the first RF beam.

29. The network entity of claim 17, wherein the one or more processors are further configured to execute the processor-executable code and cause the network entity to transmit a downlink control information (DCI) to the UE, the DCI indicating at least one of:

a first start and length indicator (SLIV) for the first communication opportunity and a second SLIV that is different from the first SLIV for the second communication opportunity;

a first frequency domain resource allocation (FDRA) for the first communication opportunity and a second FDRA that is different from the first FDRA for the second communication opportunity;

a first time domain resource allocation (TDRA) for the first communication opportunity and a second TDRA that is different from the first TDRA for the second communication opportunity;

a first modulation and coding scheme (MCS) for the first communication opportunity and a second MCS that is different from the first MCS for the second communication opportunity;

a first transmission configuration indicator (TCI) for the first communication opportunity and a second TCI that is different from the first TCI for the second communication opportunity;

any combination thereof.

30. The network entity of claim 17, wherein the one or more processors are further configured to execute the processor-executable code and cause the network entity to transmit a downlink control information (DCI) to the UE, the DCI indicating at least one of:

a start and length indicator (SLIV) for the plurality of communication opportunities;

a frequency domain resource allocation (FDRA) for the plurality of communication opportunities;

a time domain resource allocation (TDRA) for the plurality of communication opportunities;

a modulation and coding scheme (MCS) for the plurality of communication opportunities;

a transmission configuration indicator (TCI) for the plurality of communication opportunities; or any combination thereof.

* * * * *